US010191747B2

(12) United States Patent
Burger

(10) Patent No.: US 10,191,747 B2
(45) Date of Patent: Jan. 29, 2019

(54) LOCKING OPERAND VALUES FOR GROUPS OF INSTRUCTIONS EXECUTED ATOMICALLY

(71) Applicant: Microsoft Technology Licensing, LLC, Redmond, WA (US)

(72) Inventor: Doug Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 14/752,792

(22) Filed: Jun. 26, 2015

(65) Prior Publication Data

US 2016/0378495 A1    Dec. 29, 2016

(51) Int. Cl.
G06F 9/38    (2018.01)

(52) U.S. Cl.
CPC .............. *G06F 9/3802* (2013.01); *G06F 9/38* (2013.01); *G06F 9/3814* (2013.01)

(58) Field of Classification Search
CPC ........ G06F 9/3802; G06F 9/28; G06F 9/3814; G06F 9/38; G06F 9/3832
USPC ........................................................ 712/206
See application file for complete search history.

(56) References Cited

U.S. PATENT DOCUMENTS

| 5,142,631 | A | 8/1992 | Murray et al. |
| 5,333,280 | A | 7/1994 | Ishikawa et al. |
| 5,333,283 | A | 7/1994 | Emma et al. |
| 5,363,495 | A | 11/1994 | Fry et al. |
| 5,615,350 | A | 3/1997 | Hesson et al. |
| 5,790,822 | A | 8/1998 | Sheaffer et al. |
| 5,796,997 | A | 8/1998 | Lesartre et al. |
| 5,799,167 | A | 8/1998 | Lesartre |
| 5,845,102 | A | 12/1998 | Miller et al. |

(Continued)

FOREIGN PATENT DOCUMENTS

| CN | 2306094 Y | 2/1999 |
| CN | 101344843 A | 1/2009 |

(Continued)

OTHER PUBLICATIONS

Sankaralingam, K et al. TRIPS: A Polymorphous Architecture for Exploiting ILP, TLP, and DLP. ACM Transactions on Architecture and Code Optimizations (TACO), vol. 1, Issue 1, Mar. 2004, pp. 62-93 [online], [retrieved Mar. 29, 2017]. Retrieved from the Internet <URL: http://dl.acm.org/citation.cfm?id=980156>.*

(Continued)

*Primary Examiner* — Aimee Li
*Assistant Examiner* — Shawn Doman
(74) *Attorney, Agent, or Firm* — Ranjeev Singh; Singh Law, PLLC

(57) ABSTRACT

A method including fetching a group of instructions, including a group header for the group of instructions, where the group of instructions is configured to execute by a processor, and where the group header includes a field including locking information for at least one operand is provided. The method further includes storing a value of the at least one operand in at least one operand buffer of the processor and based on the locking information, locking a value of the at least one operand in the at least one operand of the buffer such that the at least one operand is not cleared from the at least one operand buffer of the processor in response to completing the execution of the group of instructions.

20 Claims, 5 Drawing Sheets

(56) References Cited

U.S. PATENT DOCUMENTS

| | | |
|---|---|---|
| 5,845,103 A | 12/1998 | Sodani et al. |
| 5,903,750 A | 5/1999 | Yeh et al. |
| 5,933,642 A | 8/1999 | Greenbaum et al. |
| 5,943,501 A | 8/1999 | Burger et al. |
| 5,983,337 A | 11/1999 | Mahalingaiah et al. |
| 5,999,737 A | 12/1999 | Srivastava |
| 6,016,399 A | 1/2000 | Chang |
| 6,044,222 A | 3/2000 | Simons et al. |
| 6,058,438 A * | 5/2000 | Diehl .................. G06F 3/14 345/503 |
| 6,061,776 A | 5/2000 | Burger et al. |
| 6,112,019 A | 8/2000 | Chamdani et al. |
| 6,161,170 A | 12/2000 | Burger et al. |
| 6,164,841 A | 12/2000 | Mattson et al. |
| 6,167,491 A | 12/2000 | McAlpine |
| 6,185,675 B1 | 2/2001 | Kranich et al. |
| 6,212,622 B1 | 4/2001 | Witt |
| 6,275,919 B1 | 8/2001 | Johnson |
| 6,279,101 B1 | 8/2001 | Witt et al. |
| 6,286,135 B1 | 9/2001 | Santhanam |
| 6,301,673 B1 | 10/2001 | Foster et al. |
| 6,360,309 B1 | 3/2002 | Iadonato et al. |
| 6,453,344 B1 | 9/2002 | Ellsworth et al. |
| 6,493,820 B2 | 12/2002 | Akkary et al. |
| 6,513,109 B1 | 1/2003 | Gschwind et al. |
| 6,523,110 B1 | 2/2003 | Bright et al. |
| 6,529,922 B1 | 3/2003 | Hoge |
| 6,564,940 B2 | 5/2003 | Blaustein et al. |
| 6,615,340 B1 | 9/2003 | Wilmot, II |
| 6,779,100 B1 | 8/2004 | Keltcher et al. |
| 6,851,043 B1 | 2/2005 | Inoue |
| 6,877,059 B2 | 4/2005 | Solomon et al. |
| 6,918,032 B1 | 7/2005 | Abdallah et al. |
| 6,934,254 B2 | 8/2005 | Brown et al. |
| 6,934,828 B2 | 8/2005 | Parthasarathy et al. |
| 6,957,320 B2 | 10/2005 | Senter et al. |
| 6,957,435 B2 | 10/2005 | Armstrong et al. |
| 6,965,969 B2 | 11/2005 | Burger et al. |
| 6,988,183 B1 | 1/2006 | Wong |
| 6,993,640 B2 | 1/2006 | Doing et al. |
| 6,996,698 B2 | 2/2006 | Slegel et al. |
| 7,032,217 B2 | 4/2006 | Wu |
| 7,036,036 B2 | 4/2006 | Vorbach et al. |
| 7,051,187 B2 | 5/2006 | Garg et al. |
| 7,051,188 B1 | 5/2006 | Kubala et al. |
| 7,152,155 B2 | 12/2006 | McIlvaine et al. |
| 7,207,038 B2 | 4/2007 | Bicsak et al. |
| 7,210,127 B1 | 4/2007 | Rangachari |
| 7,228,402 B2 | 6/2007 | Rychlik et al. |
| 7,284,100 B2 | 10/2007 | Slegel et al. |
| 7,299,458 B2 | 11/2007 | Hammes |
| 7,308,320 B2 | 12/2007 | Miyamori |
| 7,310,722 B2 | 12/2007 | Moy et al. |
| 7,380,038 B2 | 5/2008 | Gray |
| 7,392,524 B2 | 6/2008 | Ault et al. |
| 7,453,899 B1 | 11/2008 | Vaida et al. |
| 7,490,224 B2 | 2/2009 | Abernathy et al. |
| 7,526,637 B2 | 4/2009 | Jung et al. |
| 7,571,284 B1 | 8/2009 | Olson et al. |
| 7,587,578 B2 | 9/2009 | Isobe |
| 7,624,254 B2 | 11/2009 | Smith et al. |
| 7,631,170 B2 | 12/2009 | Dowling |
| 7,664,940 B2 | 2/2010 | Conklin et al. |
| 7,676,650 B2 | 3/2010 | Ukai |
| 7,685,354 B1 | 3/2010 | Hetherington et al. |
| 7,720,991 B1 | 5/2010 | Parent et al. |
| 7,779,213 B2 | 8/2010 | Ferren et al. |
| 7,802,073 B1 | 9/2010 | Cheng et al. |
| 7,805,574 B2 | 9/2010 | Bell et al. |
| 7,853,777 B2 | 12/2010 | Jones et al. |
| 7,873,776 B2 | 1/2011 | Hetherington et al. |
| 7,877,580 B2 | 1/2011 | Eickemeyer et al. |
| 7,877,586 B2 | 1/2011 | Levitan et al. |
| 7,917,733 B2 | 3/2011 | Kazuma |
| 7,958,396 B2 | 6/2011 | Chitsaz et al. |
| 8,010,953 B2 | 8/2011 | Gschwind |
| 8,032,734 B2 | 10/2011 | Svendsen et al. |
| 8,055,881 B2 | 11/2011 | Burger et al. |
| 8,055,885 B2 | 11/2011 | Nakashima |
| 8,127,119 B2 | 2/2012 | Burger et al. |
| 8,151,092 B2 | 4/2012 | Altman et al. |
| 8,166,282 B2 | 4/2012 | Madriles et al. |
| 8,180,997 B2 | 5/2012 | Burger et al. |
| 8,201,024 B2 | 6/2012 | Burger et al. |
| 8,225,315 B1 | 7/2012 | Cheng et al. |
| 8,234,635 B2 | 7/2012 | Isshiki et al. |
| 8,250,555 B1 | 8/2012 | Lee et al. |
| 8,250,556 B1 | 8/2012 | Lee et al. |
| 8,266,413 B2 | 9/2012 | Hwu et al. |
| 8,290,994 B2 | 10/2012 | Allalouf et al. |
| 8,321,850 B2 | 11/2012 | Bruening et al. |
| 8,341,639 B2 | 12/2012 | Lewis |
| 8,380,964 B2 | 2/2013 | Bishop et al. |
| 8,433,885 B2 | 4/2013 | Burger et al. |
| 8,434,074 B2 | 4/2013 | Janczak et al. |
| 8,447,911 B2 | 5/2013 | Burger et al. |
| 8,464,002 B2 | 6/2013 | Burger et al. |
| 8,464,271 B2 | 6/2013 | Eichenberger et al. |
| 8,473,724 B1 | 6/2013 | Kenville et al. |
| 8,510,596 B1 | 8/2013 | Gupta et al. |
| 8,533,436 B2 | 9/2013 | Fryman et al. |
| 8,555,038 B2 | 10/2013 | Olson et al. |
| 8,589,662 B2 | 11/2013 | Altman et al. |
| 8,589,892 B2 | 11/2013 | Fournier et al. |
| 8,612,698 B2 | 12/2013 | Lopez et al. |
| 8,612,726 B2 | 12/2013 | Sharawi et al. |
| 8,677,105 B2 | 3/2014 | Abdallah |
| 8,756,605 B2 | 6/2014 | Aingaran et al. |
| 8,817,793 B2 | 8/2014 | Mushano |
| 8,909,941 B1 | 12/2014 | Trimberger |
| 8,930,678 B2 | 1/2015 | Madduri et al. |
| 9,021,241 B2 | 4/2015 | Burger et al. |
| 9,043,769 B2 | 5/2015 | Vorbach |
| 9,053,292 B2 | 6/2015 | Abdallah |
| 9,697,002 B2 * | 7/2017 | Gschwind .............. G06F 9/3836 |
| 9,720,693 B2 | 8/2017 | Burger et al. |
| 9,946,548 B2 | 4/2018 | Burger et al. |
| 9,952,867 B2 | 4/2018 | Burger et al. |
| 2003/0004683 A1 | 1/2003 | Nemawarkar |
| 2003/0012225 A1 | 1/2003 | Banerjee et al. |
| 2003/0065835 A1 | 4/2003 | Maergner et al. |
| 2003/0101208 A1 | 5/2003 | Chauvel et al. |
| 2003/0149862 A1 | 8/2003 | Kadambi |
| 2004/0123078 A1 * | 6/2004 | Hum .................. G06F 9/3004 712/217 |
| 2004/0139299 A1 | 7/2004 | Busaba et al. |
| 2005/0076194 A1 | 4/2005 | Kanapathippillai et al. |
| 2006/0020769 A1 | 1/2006 | Herrell et al. |
| 2006/0020944 A1 | 1/2006 | King |
| 2006/0031702 A1 | 2/2006 | Jardine et al. |
| 2006/0041875 A1 | 2/2006 | Peri et al. |
| 2006/0075207 A1 | 4/2006 | Togawa et al. |
| 2006/0136915 A1 | 6/2006 | Aingaran et al. |
| 2006/0259739 A1 | 11/2006 | Asal et al. |
| 2006/0259740 A1 | 11/2006 | Hahn et al. |
| 2006/0282624 A1 | 12/2006 | Yokota |
| 2007/0050557 A1 | 3/2007 | Ferren et al. |
| 2007/0055827 A1 | 3/2007 | Tsien |
| 2007/0074011 A1 | 3/2007 | Borkar et al. |
| 2007/0113171 A1 | 5/2007 | Behrens et al. |
| 2007/0157006 A1 | 7/2007 | Jourdan et al. |
| 2007/0162906 A1 | 7/2007 | Chandhoke |
| 2007/0192540 A1 | 8/2007 | Gara et al. |
| 2007/0239965 A1 | 10/2007 | Lewites et al. |
| 2007/0255980 A1 | 11/2007 | Endo et al. |
| 2008/0046621 A1 | 2/2008 | Okino et al. |
| 2008/0109668 A1 | 5/2008 | Atkinson |
| 2008/0126750 A1 | 5/2008 | Sistla |
| 2008/0192050 A1 | 8/2008 | Schardt et al. |
| 2008/0235493 A1 | 9/2008 | Fortier |
| 2008/0235499 A1 | 9/2008 | Togawa |
| 2008/0244506 A1 | 10/2008 | Killian et al. |
| 2008/0250227 A1 | 10/2008 | Linderman et al. |
| 2009/0013135 A1 | 1/2009 | Burger et al. |

(56) References Cited

U.S. PATENT DOCUMENTS

| | | |
|---|---|---|
| 2009/0013153 A1 | 1/2009 | Hilton |
| 2009/0013160 A1 | 1/2009 | Burger et al. |
| 2009/0150657 A1 | 6/2009 | Gschwind et al. |
| 2009/0172365 A1 | 7/2009 | Orenstien et al. |
| 2009/0177843 A1 | 7/2009 | Wallach et al. |
| 2009/0187739 A1 | 7/2009 | Nemirovsky et al. |
| 2009/0299966 A1 | 12/2009 | Schneider |
| 2010/0070958 A1 | 3/2010 | Takagi |
| 2010/0082947 A1 | 4/2010 | Tramm et al. |
| 2010/0146209 A1 | 6/2010 | Burger et al. |
| 2010/0262807 A1 | 10/2010 | Burky et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0219222 A1 | 9/2011 | Eichenberger et al. |
| 2011/0238953 A1 | 9/2011 | Metsugi et al. |
| 2011/0252258 A1 | 10/2011 | Im et al. |
| 2012/0030451 A1 | 2/2012 | Pong et al. |
| 2012/0079102 A1 | 3/2012 | Damodaran et al. |
| 2012/0124345 A1 | 5/2012 | Denman et al. |
| 2012/0131309 A1 | 5/2012 | Johnson et al. |
| 2012/0216012 A1 | 8/2012 | Vorbach et al. |
| 2012/0246448 A1 | 9/2012 | Abdallah |
| 2012/0246450 A1 | 9/2012 | Abdallah |
| 2012/0303933 A1 | 11/2012 | Manet et al. |
| 2012/0311306 A1 | 12/2012 | Mushano |
| 2013/0024676 A1 | 1/2013 | Glew et al. |
| 2013/0046954 A1 | 2/2013 | Ruehle et al. |
| 2013/0159628 A1* | 6/2013 | Choquette ............ G06F 9/3009 711/125 |
| 2013/0191817 A1 | 7/2013 | Vorbach |
| 2013/0198499 A1 | 8/2013 | Dice et al. |
| 2013/0339470 A1 | 12/2013 | Jeswani et al. |
| 2014/0033217 A1 | 1/2014 | Vajda et al. |
| 2014/0082327 A1 | 3/2014 | Ghose |
| 2014/0095837 A1 | 4/2014 | Plotnikov et al. |
| 2014/0136822 A1 | 5/2014 | Suggs et al. |
| 2014/0173222 A1 | 6/2014 | Alapati et al. |
| 2014/0173262 A1 | 6/2014 | Chheda et al. |
| 2014/0181475 A1 | 6/2014 | Abdallah |
| 2014/0189287 A1 | 7/2014 | Plotnikov et al. |
| 2014/0195787 A1 | 7/2014 | Scalabrino et al. |
| 2014/0201507 A1 | 7/2014 | Jayaseelan et al. |
| 2014/0281389 A1 | 9/2014 | Loktyukhin et al. |
| 2014/0281416 A1 | 9/2014 | Abdallah |
| 2014/0281424 A1 | 9/2014 | Bobba et al. |
| 2014/0281434 A1 | 9/2014 | Madriles et al. |
| 2014/0281622 A1 | 9/2014 | Wagh et al. |
| 2014/0282607 A1 | 9/2014 | O'sullivan et al. |
| 2014/0298336 A1 | 10/2014 | Taniuchi |
| 2014/0317387 A1 | 10/2014 | Abdallah |
| 2014/0331236 A1 | 11/2014 | Mitra et al. |
| 2014/0351524 A1 | 11/2014 | Natarajan et al. |
| 2014/0372736 A1 | 12/2014 | Greenhalgh |
| 2014/0373022 A1 | 12/2014 | Chan |
| 2015/0019921 A1 | 1/2015 | Chen et al. |
| 2015/0067214 A1 | 3/2015 | Henry et al. |
| 2015/0067662 A1 | 3/2015 | Palalau |
| 2015/0074355 A1 | 3/2015 | Sampathkumar et al. |
| 2015/0095628 A1 | 4/2015 | Yamada et al. |
| 2015/0100757 A1 | 4/2015 | Burger et al. |
| 2015/0127928 A1 | 5/2015 | Burger et al. |
| 2015/0199199 A1 | 7/2015 | Burger et al. |
| 2015/0199272 A1 | 7/2015 | Goel et al. |
| 2016/0055004 A1 | 2/2016 | Grochowski et al. |
| 2016/0179546 A1 | 6/2016 | Yamada et al. |
| 2016/0274915 A1* | 9/2016 | Chatha ................ G06F 9/3855 |
| 2016/0328237 A1 | 11/2016 | Di et al. |
| 2016/0378479 A1 | 12/2016 | Burger et al. |
| 2016/0378483 A1 | 12/2016 | Burger et al. |
| 2016/0378484 A1 | 12/2016 | Burger et al. |
| 2016/0378488 A1 | 12/2016 | Burger et al. |
| 2016/0378491 A1 | 12/2016 | Burger et al. |
| 2016/0378499 A1 | 12/2016 | Burger et al. |
| 2016/0378502 A1 | 12/2016 | Burger et al. |
| 2016/0378661 A1 | 12/2016 | Gray et al. |
| 2017/0083343 A1 | 3/2017 | Burger |

FOREIGN PATENT DOCUMENTS

| | | |
|---|---|---|
| CN | 102096579 A | 6/2011 |
| CN | 102306094 A | 1/2012 |
| CN | 104310225 A | 1/2015 |
| EP | 0583089 A2 | 2/1994 |
| EP | 0992894 A1 | 4/2000 |
| EP | 1039374 A2 | 9/2000 |
| EP | 1102163 A2 | 5/2001 |
| EP | 2527972 A2 | 11/2012 |
| WO | 2001025903 A1 | 4/2001 |
| WO | 2004001587 A2 | 12/2003 |
| WO | 2006102664 A2 | 9/2006 |
| WO | 2009006607 A1 | 1/2009 |
| WO | 2011031361 A1 | 3/2011 |
| WO | 2013081556 A1 | 6/2013 |
| WO | 2013095635 A1 | 6/2013 |
| WO | 2014014216 A1 | 1/2014 |
| WO | 2014193878 A1 | 12/2014 |
| WO | 2015069583 A1 | 5/2015 |

OTHER PUBLICATIONS

Burger, D et al. Design and Implementation of the TRIPS EDGE Architecture. Jun. 4, 2005. Retrieved from the Internet <URL: https://www.cs.utexas.edu/~trips/talks/trips_tutorial_6up.pdf>.*

Burger, et al., "Scaling to the End of Silicon with EDGE Architectures", In Proceedings of the IEEE Computer Society, vol. 7, Issue 7, Jul. 1, 2004, pp. 44-55.

"International Search Report and Written Opinion Issued in PCT Application No. PCT/US2016/038843", dated Oct. 10, 2016, 11 Pages.

Sankaralingam, et al., "TRIPS: A Polymorphous Architecture for Exploiting ILP, TLP and DLP", In ACM Transactions on Architecture and Code Optimization, vol. 1, Issue 1, Mar. 1, 2004, pp. 62-93.

Budiu, et al., "Optimizing Memory Accesses for Spatial Computation", In Proceedings of First International Symposium on Code Generation and Optimization, Mar. 23, 2003, 13 pages.

Smith, et al., "Compiling for EDGE Architectures", In Proceedings of the International Symposium on Code Generation and Optimization, Mar. 26, 2006, 11 pages.

Budiu, et al., "Pegasus: An Efficient Intermediate Representation", In Technical Report, Apr. 2002, 20 pages.

Maher, et al., "Merging Head and Tail Duplication for Convergent Hyperblock Formation", In Proceedings of the 39th Annual IEEE/ACM International Symposium on Microarchitecture, Dec. 9, 2006, 12 pages.

Xue, et al., "Partial Dead Code Elimination on Predicated Code Regions", In Journal of Software—Practice & Experience, vol. 36, No. 15, Dec. 2006, 32 pages.

Cooper, et al., "Loop Invariant Code Motion—Classical Approaches", Retrieved on: Apr. 8, 2015, Available at: http://booksite.elsevier.com/9780120884780/Graduate_Lecture_Slides/Optimizations/23CM-classic.ppt.

Nethercote, et al., "Self-Evaluating Compilation Applied to Loop Unrolling", In Technical Report TR-06, Feb. 2006, 17 pages.

"Loop-Invariant Code Motion with Unsafe Operations", Retrieved on: Apr. 8, 2015, Available at: http://cs.stackexchange.com/questions/28054/loop-invariant-code-motion-with-unsafe-operations.

"Second Written Opinion Issued in PCT Application No. PCT/US2016038843", dated Jun. 7, 2017, 6 Pages.

"International Preliminary Report on Patentability Issued in PCT Application No. PCT/US2016/038843", dated Sep. 13, 2017, 7 Pages.

"Explicit Data Graph Execution", Retrieved From: https://en.wikipedia.org/wiki/Explicit_Data_Graph_Execution, Retrieved on: Jun. 13, 2017, 5 Pages.

"How Many Clock Cycles does a RISCICISC Instruction Take to Execute?", Retrieved from: http://electronics.stackexchange.com/

(56) References Cited

OTHER PUBLICATIONS questions/170551/how-many-clock-cycles-does-a-risc-cisc-instruction-take-to-execute, Retrieved on: Aug. 24, 2015, 5 Pages.
"Intel 64 Architecture Processor Topology Enumeration", In White Paper of Intel, Dec. 13, 2013, 29 Pages.
"Load/store architecture", Retrieved From: https://en.wikipedia.org/wiki/Load/store_architecture, Retrieved Date: Sep. 24, 2015, 1 Page.
"Programmatic API for Building Resources", Retrieved From: https://web.archive.org/web/20150706082232/https://jersey.java.net/nonav/documentation/2.0/resource-builder.html, Nov. 3, 2014, 3 Pages.
"TRIPS (The Tera-op, Reliable, Intelligently adaptive Processing System)", Retrieved from: http://www.cs.utexas.edu/users/cart/trips/, 1 Page.
"Non-Final Office Action Issued in U.S. Appl. No. 14/752,356", dated Mar. 21, 2017, 22 Pages.
"Non Final Office Action Issued in U.S. Appl. No. 14/752,418", dated May 18, 2017, 20 Pages.
"Non-Final Office Action Issued in U.S. Appl. No. 14/752,596", dated May 10, 2017, 22 Pages.
"Non Final Office Action Issued in U.S. Appl. No. 14/752,636", dated Apr. 14, 2017, 15 pages.
"Non Final Office Action Issued in U.S. Appl. No. 14/752,660", dated Apr. 6, 2017, 22 Pages.
"Non-Final Office Action Issued in U.S. Appl. No. 14/752,682", dated May 5, 2017, 10 Pages.
"Non-Final Office Action Issued in U.S. Appl. No. 14/752,727", dated Apr. 14, 2017, 11 Pages.
"Non-Final Office Action Issued in U.S. Appl. No. 14/752,797", dated Apr. 18, 2017, 10 Pages.
Aasaraai, et al., "Design Space Exploration of Instruction Schedulers for Out-ofOrder Soft Processors", In Proceedings of the International Conference on Field Programmable Technology, Dec. 8, 2010, 4 Pages.
Abraham, et al., "Predictability of Load/Store Instruction Latencies", In Proceedings of the 26th Annual International Symposium on Microarchitecture, Dec. 1, 1993, pp. 139-152.
Anderson, Michael, "A Framework for Composing High-Performance OpenCL from Python Descriptions", In Technical Report of UCB/EECS-2014-210, Dec. 5, 2014, 144 Pages.
Appelbe, et al., "Hoisting Branch Conditions—Improving Super-Scalar Processor Performance, Languages and Compilers for Parallel Computing", In Proceedings of the 8th International Workshop on Languages and Compilers for Parallel Computing, Aug. 10, 1995, 14 Pages.
August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.
Bakhoda, et al., "Microsoft Research—E2", Retrieved from: http://research.microsoft.com/en-us/projects/e21, Retrieved on: Apr. 10, 2015, 2 Pages.
Benson, et al., "Design, Integration and Implementation of the DySER Hardware Accelerator", In Proceedings of 18th International Symposium on High Performance Computer Architecture, Feb. 25, 2012, 12 Pages.
Bouwens, et al., "Architecture Enhancements for the ADRES Coarse-Grained Reconfigurable Array", In Proceedings of the 3rd International Conference on High Performance Embedded Architectures and Compilers, Jan. 27, 2008, pp. 66-81.
Burger, et al., "Design and Implementation of the Trips Edge Architecture", In Proceedings of the 32nd Annual International Symposium on Computer Architecture, Jun. 4, 2005, 41 Pages.
Bush, et al., "Evaluation and Optimization of Signal Processing Kernels on the TRIPS Architecture", In Proceedings of 4th Annual Workshop on Optimizations for DSP and Embedded Systems, Mar. 2006, 10 Pages.
Bush, Jeff, "Microarchitecture", Retrieved form: https://github.com/jbush001/NyuziProcessor/wiki/Microarchitecture:, Retrieved on Aug. 24,2015, 7 Pages.
Cain, et al., "Memory Ordering: A Value-Based Approach", In Journal of IEEE Computer Society, vol. 24, Issue 1, Nov., 2004, pp. 110-117.
Carli, Roberto, "Flexible MIPS Soft Processor Architecture", In Technical Report of Massachusetts Institute of Technology, Jun. 16, 2008, pp. 1-49.
Chang, et al., "Cooperative Caching for Chip Multiprocessors", In Proceedings of the 33rd annual international symposium on Computer Architecture Jun. 17, 2006, 12 Pages.
Cheah, et al., "Analysis and Optimization of a Deeply Pipelined FPGA Soft Processor", In Proceedings of International Conference on Field-Programmable Technology, Dec. 10, 2014, 4 Pages.
Chiu, et al., "Hyperscalar: A Novel Dynamically Reconfigurable Multi-core Architecture", In Proceedings of 39th International Conference on Parallel Processing, Sep. 13, 2010, 10 Pages.
Choudhury, A.N.M Imroz., "Visualizing Program Memory Behavior Using Memory Reference Traces", In Ph.D. Thesis of University of Utah, Aug. 2012, 158 Pages.
Chrysos, et al., "Memory Dependence Prediction using Store Sets", In Proceedings of the 25th Annual International Symposium on Computer Architecture vol. 26, Issue-3, Jun. 1998, pp. 142-153.
Coons, et al., "A Spatial Path Scheduling Algorithm for Edge Architectures", In Proceedings of 12th International conference on Architectural Support for Programming Languages and Operating Systems, Oct. 20, 2006, 12 Pages.
Coons, et al., "Feature Selection for Instruction Placement in an Edge Architecture", Retrieved From: https://pdfs.semanticscholar.org/4c38/8fbe53827627c21a9d2a650395ed4470e544.pdf, Mar. 17, 2007, 6 Pages.
Desikan, et al., "Scalable Selective Re-Execution for Edge Architectures", In Proceedings of the 11th International Conference on Architectural Support for Programming Languages and Operating Systems, Oct. 9, 2004, 13 Pages.
Dittmann, Gero, "On Instruction-Set Generation for Specialized Processors", In Dissertation Submitted to the Swiss Federal Institute of Technology Zurich for the Degree of Doctor of Technical Sciences, 2005, 122 Pages.
Duong, et al., "Compiler-Assisted, Selective Out-of-Order Commit", In Journal of IEEE Computer Architecture Letters, vol. 12, Issue 1, Jan. 2013, 4 Pages.
Duric, et al., "Dynamic-Vector Execution on a General Purpose Edge Chip Multiprocessor", In Proceedings of International Conference on Embedded Computer Systems: Architectures, Modeling, and Simulation, Jul. 14, 2014, pp. 18-25.
Duric, et al., "EVX: Vector Execution on Low Power Edge Cores", In Proceedings of Conference on Design, Automation and Test in Europe Conference and Exhibition, Mar. 24, 2014, 4 Pages.
Duric, et al., "ReCompac: Reconfigurable Compute Accelerator", In Proceedings of International Conference on Reconfigurable Computing and FPGAs, Dec. 9, 2013, 4 Pages.
Essen, et al., "Energy-Efficient Specialization of Functional Units in a Coarse-Grained Reconfigurable Array", In Proceedings of the 19th ACM/SIGDA International Symposium on Field Programmable Gate Arrays, Feb. 27, 2011, 4 Pages.
Fallin, et al., "The Heterogeneous Block Architecture", In Proceedings of 32nd IEEE International Conference on Computer Design, Oct. 19, 2014, 8 Pages.
Gaudiot, et al., "The Sisal Model of Functional Programming and its Implementation", In Proceedings of Second Aizu International Symposium on Parallel Algorithms/Architectures Synthesis, Mar. 17, 1997, 12 Pages.
Gebhart, et al., "An Evaluation of the TRIPS Computer System", In the Proceedings of the 14th International Conference on Architecture Support for Programming Languages and Operating System, Mar. 7, 2009, 14 Pages.
Gonzalez, et al., "Dependence Speculative Multithreaded Architecture.", In Technical Report, 1998, 22 Pages.
Govindan, Madhu Sarava., "E3:Energy-Efficient EDGE Architectures", In Dissertation Presented to the Faculty of Graduate School

(56) References Cited

OTHER PUBLICATIONS of the university of Texas in Partial Fulfillment of the Requirements for the Degree of doctor of Philosophy, Aug. 2010, 244 Pages.

Govindan, et al., "Scaling Power and Performance via Processor Composability", In Proceedings of IEEE Transactions on Computers, vol. 63, Issue 8, Aug. 2014, 14 Pages.

Govindan, et al., "TRIPS: A Distributed Explicit Data Graph Execution (EDGE) Microprocessor", In Proceedings of IEEE Symposium on Hot Chips 19, Aug. 19, 2007, 13 Pages.

Govindaraju, et al., "DySER: Unifying Functionality and Parallelism Specialization for Energy-Efficient Computing", In Proceedings of IEEE Micro vol. 32, Issue 5, Jul. 10, 2012, pp. 38-51.

Gray, et al., "Towards an Area-Efficient Implementation of a High ILP EDGE Soft Processor: Comparing Out-of-Order Dataflow Instruction Scheduler Designs", In Proceedings of the 22nd IEEE International Symposium on Field-Programmable Custom Computing Machines, May 11, 2014, 1 Page.

Gulati, et al., "Multitasking Workload Scheduling on Flexible Core Chip Multiprocessors", In Proceedings of International Conference on Parallel Architectures and Compilation Techniques, Oct. 25, 2008, 10 Pages.

Gupta, Anshuman, "Design Decisions for Tiled Architecture Memory Systems", Retrieved from: https://pdfs.semanticscholar.org/9100/c6bbb1f56997b8cad6c1661ee1ce1aa90ee5.pdf :, Sep. 18, 2009, 14 Pages.

Gupta, et al., "Erasing Core Boundaries for Robust and Configurable Performance", In Proceedings of 43rd Annual IEEE/ACM International Symposium on Microarchitecture., Dec. 4, 2010, 12 Pages.

Hammond, et al., "Programming with Transactional Coherence and Consistency (TCC)", In Proceedings of ACM SIGOPS Operating Systems Review. vol. 38, Issue 5., Oct. 7, 2004, 13 Pages.

Hammond, et al., "Transactional Coherence and Consistency: Simplifying Parallel Hardware and Software", In Proceedings of IEEE Computer Society, vol. 24, Issue 6, Nov. 2004, pp. 92-103.

Hammond, et al., "Transactional Memory Coherence and Consistency", In Proceedings of 31st Annual International Symposium on Computer Architecture vol. 32, Issue No. 2, Jun. 19, 2004, 12 Pages.

Hao, et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Hayes, et al., "Unified On-chip Memory Allocation for SIMT Architecture", In Proceedings of the 28th ACM International conference on Supercomputing, Jun. 10, 2014, 10 Pages.

Hruska, Joel, "VISC CPU 'virtual core' design emerges: Could this be the conceptual computing breakthrough we've been waiting for?", Retrieved From: https://www.extremetech.com/extreme/192858-visc-cpu-virtual-core-design-emerges-could-this-be-the-conceptual-breakthrough-weve-been-waiting-for :, Oct. 24, 2014, 9 Pages.

Huang, et al., "Compiler-Assisted Sub-Block Reuse", In UMSI Research Report, vol. 73, May 2000, 21 Pages.

Huang, Jian, "Improving Processor Performance Through Compiler-Assisted Block Reuse", In Dissertation Submitted in Partial Fulfillment of the Requirements for the Degree of Doctor of Philosophy, May 2000, 125 Pages.

Ipek, et al., "Core Fusion: Accommodating Software Diversity in Chip Multiprocessors", In Proceedings of the 34th Annual International Symposium on Computer Architecture, Jun. 9, 2007, 12 Pages.

Jones, et al., "A Comparison of Data Prefetching on an Access Decoupled and Superscalar Machine", In Proceedings of the Thirtieth Annual IEEE/ACM International Symposium on Microarchitecture, Dec. 3, 1997, 6 Pages.

Junier, et al., "Impact Of Instruction Cache Replacement Policy On The Tightness Of WCET Estimation", In Proceedings of the 2nd Junior Researcher Workshop on Real-Time Computing, in conjunction to RTNS., Oct. 16, 2008, 4 Pages.

Kamaraj, et al., "Design of Out-Of-Order Superscalar Processor with Speculative Thread Level Parallelism", In Proceedings of International Conference on Innovations in Engineering and Technology, Mar. 21, 2014, pp. 1473-1478.

Kane, "PA-RISC 2.0 Architecture", In Publication of Prentice Hall PTR, Jan. 1, 1996, 28 Pages.

Kavi, et al., "Concurrency, Synchronization, Speculation—the Dataflow Way", In Journal of Advances in Computers, vol. 96, Nov. 23, 2013, 41 Pages.

Keckler, et al., "Tera-Op Reliable Intelligently Adaptive Processing System (Trips)", In AFRL-IF-WP-TR-2004-1514 (Stinfo Final Report), Apr. 2004, 29 Pages.

Kim, et al., "Composable Lightweight Processors", In Proceedings of 40th Annual ACM International Symposium on Microarchitecture, Dec. 1, 2007, pp. 381-393.

Kinsy, et al., "Heracles: A Tool for Fast RTL-Based Design Space Exploration of Multicore Processors", In Proceedings of the ACM/SIGDA International Symposium on Field Programmable Gate Arrays, Feb. 11, 2013, pp. 125-134.

Kocabas, et al., "Enhancing an Embedded Processor Core with a Cryptographic Unit for Performance and Security", In Proceedings of the 4th International Conference on Reconfigurable Computing and FPGAs, Dec. 3, 2008, pp. 409-414.

Kozumplik, et al., "Trips to the Semantic EDGE", Retrieved From: https://web.archive.org/web/20150921054006/http://vbn.aau.dk/ws/files/61072300/1212050422.pdf :, Sep. 22, 2015, 28 Pages.

Li, et al., "Code Layout Optimization for Defensiveness and Politeness in Shared Cache", In Proceedings of 43rd International Conference on Parallel Processing, Sep. 9, 2014, 11 Pages.

Li, et al. "Compiler-Assisted Hybrid Operand Communication", In Technical Report TR-09-33, Nov. 1, 2009, 12 Pages.

Li, et al. "Hybrid Operand Communication for Dataflow Processors", In Workshop on Parallel Execution of Sequential Programs on Multi-core Architectures, Jun. 21, 2009, 10 Pages.

Liu, Haiming, "Hardware Techniques to Improve Cache Efficiency", In Dissertation Presented At the Faculty of the Graduate School of the University of Texas at Austin, May 2009, 189 Pages.

Maher, Bertrand Allen., "Atomic Block Formation for Explicit Data Graph Execution Architectures", In Dissertation Presented to the Faculty of the Graduate School of the University of Texas at Austin in Partial Fulfillment of the Requirements for the Degree of Doctor of Philosophy, Aug. 2010, 185 Pages.

Maher, et al., "The Good Block: Hardware/Software Design for Composable, Block-Atomic Processors", In Proceedings of 15th Workshop on Interaction between Compilers and Computer Architectures, Feb. 12, 2011, 8 Pages.

McDonald, et al., "Characterization of TCC on Chip-Multiprocessors", In Proceedings of 14th International Conference on Parallel Architectures and Compilation Techniques., Sep. 17, 2005, 12 Pages.

McDonald, et al., "TRIPS Processor Reference Manual, Department of Computer Sciences", In Technical Report TR-05-19, Mar. 10, 2005, 194 Pages.

Mei, Bingfeng, et al., "ADRES: an architecture with tightly coupled VLIW processor and coarse-grained-reconfigurable matrix", In Proceedings of 13th International conference on Field-Programmable Logic and Applications, Sep. 9, 2003, 10 Pages.

Melvin, et al., "Enhancing Instruction Scheduling with a Block-Structured ISA", In Proceedings of International Journal of Parallel Programming, vol. 23, No. 3, Jun. 1, 1995, pp. 221-243.

Munshi, et al., "A Parameterizable SIMD Stream Processor", In Proceedings of Canadian Conference on Electrical and Computer Engineering, May 1, 2005, pp. 806-811.

Muraoka, et al., "VCore-based design methodology", In Proceedings of the Asia and South Pacific Design Automation Conference, Jan. 21, 2003, 5 Pages.

Nagarajan, et al., "A Design Space Evaluation of Grid Processor Architectures", In Proceedings of the 34th Annual IEEE International Symposium on Microarchitecture, Dec. 1, 2001, pp. 40-51.

Nagarajan, et al., "Critical Path Analysis of the Trips Architecture", In Proceedings of International Symposium on Performance Analysis of Systems and Software, Mar. 19, 2006, 11 Pages.

Nagarajan, Ramadass, "Design and Evaluation of a Technology-Scalable Architecture for Instruction-Level Parallelism", Dissertation Presented to the Faculty of the Graduate School of the Uni-

(56) References Cited

OTHER PUBLICATIONS versity of Texas at Austin in Partial Fulfillment of the Requirements for the Degree of Doctor of Philosophy, May 2007, 260 Pages.
Nagarajan, R, et al., "Static Placement dynamic issue (SPDI) scheduling for EDGE architectures.", In Proceedings 13th International Conference on Parallel Architecture and compilation techniques., Sep. 29, 2004, 11 Pages.
Office Action Issued in Colombian Patent Application No. NC2017/0013251, dated Jul. 4, 2018, 14 Pages. (W/O English Translation).
"Office Action Issued in Colombian Patent Application No. NC2017/0013252", dated Jul. 5, 2018, 13 Pages. (W/O English Translation).
"Office Action Issued in Colombian Patent Application No. NC2017/0013277", dated Jul. 9, 2018, 13 Pages. (WO English Translation).
Park, et al., "Polymorphic Pipeline Array: A Flexible Multicore Accelerator with Virtualized Execution for Mobile Multimedia Applications", In Proceedings of the 42nd Annual IEEE/ACM International Symposium on Microarchitecture, Dec. 12, 2009, pp. 370-380.
Park, et al., "Reducing Design Complexity of the Load/Store Queue", In Proceedings of the 36th annual IEEE/ACM International Symposium on Microarchitecture, Dec. 3, 2003, 12 Pages.
"International Preliminary Report on Patentability Issued in PCT Patent Application No. PCT/US2014/039654", dated Aug. 17, 2015, 11 Pages.
"International Search Report & Written Opinion for PCT Patent Application No. PCT/US2014/039654", dated Aug. 26, 2014, 13 Pages.
"Second Written Opinion Issued in PCT Patent Application No. PCT/US2014/039654", dated Mar. 3, 2015, 7 Pages.
"International Search Report and Written Opinion Issued in PCT Application No. PCT/US2016/038842", dated Oct. 6, 2016, 11 Pages.
"International Search Report and Written Opinion Issued in PCT Application No. PCT/US2016/038845", dated Sep. 30, 2016, 14 Pages.
"International Search Report and Written Opinion Issued in PCT Application No. PCT/US2016/038846", dated Oct. 6, 2016, 11 Pages.
"International Search Report and Written Opinion Issued in PCT Application No. PCT/US2016/038847", dated Nov. 9, 2016, 10 Pages.
"International Search Report and Written Opinion Issued in PCT Application No. PCT/US2016/038848", dated Oct. 5, 2016, 11 Pages.
"International Search Report and Written Opinion Issued in PCT Application No. PCT/US2016/038849", dated Sep. 30, 2016, 14 Pages.
"International Search Report and Written Opinion Issued in PCT Application No. PCT/US2016/038850", dated Sep. 22, 2016, 12 Pages.
"International Search Report and Written Opinion Issued in PCT Application No. PCT/US2016/038851", dated Sep. 27, 2016, 11 Pages.
"International Preliminary Report on Patentability Issued in PCT Application No. PCT/US2016/038852", dated Sep. 13, 2017, 9 Pages.
"International Search Report and Written opinion issued in PCT Application No. PCT/US2016/038852", dated Sep. 23, 2016, 14 Pages.
"Second Written Opinion Issued in PCT Application No. PCT/US2016/038852", dated May 24, 2017, 5 Pages.
"International Search Report and Written Opinion Issued in PCT Application No. PCT/US2016/038853", dated Sep. 22, 2016, 15 Pages.
"Second Written Opinion Issued in PCT Application No. PCT/US2016/038853", dated May 24, 2017, 6 Pages.
"International Search Report and Written Opinion Issued in PCT Application No. PCT/US2016/038854", dated Sep. 22, 2016, 13 Pages.
"International Search Report and Written Opinion Issued in PCT Application No. PCT/US2016/038855", dated Sep. 27, 2016, 13 Pages.
"Second Written Opinion Issued in PCT Application No. PCT/US2016/038855", dated May 18, 2017, 8 Pages.
"International Search Report and Written Opinion Issued in PCT Application No. PCT/US2016/051209", dated Dec. 16, 2016, 10 Pages.
"International Search Report and Written Opinion Issued in PCT Application No. PCT/US2016/051413", dated Jan. 2, 2017, 16 Pages.
"International Search Report and Written Opinion Issued in PCT Application No. PCT/US2016/051417", dated Dec. 15, 2016, 10 Pages.
Pengfei, et al., "M5 Based Edge Architecture Modeling", In Proceedings of International Conference on Computer Design, Oct. 3, 2010, pp. 289-296.
Peon, et al., "HPACK—Header Compression for HTTP/2", Retrieved From: ttp://tools.ieff.org/html/draft-ieff-httpbis-header-compression-09#page-8 :, Jul. 31, 2014, 114 Pages.
Pericas, et al., "A Decoupled KILO-Instruction Processor", In Proceedings of the Twelfth International Symposium on High-Performance Computer Architecture, Feb. 11, 2006, 12 Pages.
Pericas, et al., "A Two-Level Load/Store Queue Based on Execution Locality", In Proceedings of International Symposium on Computer Architecture vol. 36, Issue-3, Jun. 21, 2008, 12 Pages.
Pickett, Christopher John Francis., "Software Method Level Speculation for Java", In Thesis Submitted to Mcgill University in Partial Fulfillment of the Requirement of the Degree of Doctor of Philosophy, Apr. 2012, 236 Pages.
Pierce, et al., "Wrong-Path Instruction Prefetching", In Proceedings of the 29th Annual IEEE/ ACM International Symposium on Microarchitecture, Dec. 2, 1996, 17 Pages.
Pricopi, et al., "Bahurupi: A Polymorphic Heterogeneous Multi-Core Architecture", In Proceedings of ACM Transactions on Architecture and Code Optimization, vol. 8, Issue 4, Jan. 1, 2012, 22 Pages.
Putnam, et al., "Dynamic Vectorization in the E2 Dynamic Multicore Architecture", In ACM SIGARCH Computer Architecture News, vol. 38, Issue 4, Sep. 14, 2010, 6 Pages.
Rahman, Rezaur, "Intel Xeon Phi Core Micro-Architecture", Retrieved from: https://software.intel.com/en-us/articles/intel-xeon-phi-core-micro-architecture :, May 31, 2013, 28 Pages.
Reinman, et al., "Optimizations Enabled by a Decoupled Front-End Architecture", In Proceedings of IEEE Transactions on computers, vol. 50 Issue 4, Apr. 1, 2001, 32 Pages.
Robatmili, Behnam, "Efficient Execution of Sequential Applications on Multicore systems", In Dissertation Presented to the Faculty of the Graduate School of the University of Texas at Austin in Partial Fulfillment of the Requirements for the Degree of the Doctor of Philosophy, Aug. 2011, 198 Pages.
Robatmili, et al., "Exploiting Criticality to Reduce Bottlenecks in Distributed Uniprocessors", In Proceedings of 17th IEEE International Symposium on High-Performance Computer Architecture, Feb. 2011, 12 Pages.
Robatmili, et al., "How to Implement Effective Prediction and Forwarding for Fusable Dynamic Multicore Architectures", In Proceedings of IEEE 19th International Symposium on High Performance Computer Architecture, Feb. 23, 2013, 12 Pages.
Robatmili, et al., "Strategies for Mapping Dataflow Blocks to Distributed Hardware", In the proceedings of the 41st IEEE/ACM International Symposium on Microarchitecture, Nov. 8, 2008, pp. 23-34.
Roesner, Franziska, "Counting Dependence Predictors", In Undergraduate Honors Thesis Submitted to Department of Computer Sciences, University of Texas at Austin, May 2, 2008, 25 Pages.
Sankaralingam, et al., "Distributed Microarchitectural Protocols in the TRIPS Prototype Processor", In Proceedings of the 39th Annual IEEE/ACM International Symposium on Microarchitecture, Dec. 9, 2006, 12 Pages.

(56) References Cited

OTHER PUBLICATIONS

Sankaralingam, et al., "Exploiting ILP, TLP, and DLP with Polymorphous TRIPS Architecture", In Proceedings of 30th Annual International Symposium on Computer Architecture, Jun. 9, 2003, 12 Pages.

Sankaralingam, Karthikeyan, "Polymorphous Architectures: A Unified Approach for Extracting Concurrency of Different Granularities", In Dissertation Presented to the Faculty of the Graduate School of the University of Texas at Austin., Aug. 2007, 276 Pages.

Sarkar, et al., "Understanding Power Multiprocessors", In Proceedings of the 32nd ACM SIGPLAN Conference on Programming Language Design and Implementation, Jun. 4, 2011, 12 Pages.

Sethumadhavan, et al., "Design and Implementation of the TRIPS Primary Memory System", In Proceedings of International Conference on Computer Design, ICCD, Oct. 1, 2006, 7 Pages.

Sethumadhavan, et al., "Late-Binding: Enabling Unordered Load-Store Queues", In Proceedings of the 34th Annual International Symposium on Computer Architecture, Jun. 9, 2007, pp. 347-357.

Smith, et al., "Dataflow Predication", In Proceedings of the 39th Annual IEEE/ACM International Symposium on Microarchitecture, Dec. 9, 2006, 12 Pages.

Smith, et al., "TRIPS Application Binary Interface (ABI) Manual", In Technical Report TR-05-22, Department of Computer Sciences, Oct. 10, 2006, 16 Pages.

Sohi, et al., "Multiscalar Processors", In Proceedings of 22nd Annual International Symposium on Computer Architecture, vol. 23, Issue-2, Jun. 22, 1995, 12 Pages.

Sohi, Gurindar, "Retrospective: Multiscalar Processors", In Proceedings of the 25th Annual International Symposium on Computer Architectures, Jun. 27, 1998, pp. 111-114.

Souza, et al., "Dynamically Scheduling VLIW Instructions", In Journal of Parallel and Distributed Computing, vol. 50 Jul. 2000, pp. 1480-1511.

Tamches, et al., "Dynamic Kernel Code Optimization", In Workshop on Binary Translation, Sep. 2001, 10 Pages.

Uhlig, Richard Albert., "Trap-driven Memory Simulation", In Dissertation Submitted in Partial Fulfillment of the Requirements for the Degree of Doctor of Philosophy, Aug. 1995, 203 Pages.

Uhrig, et al., "The Two-dimensional Superscalar GAP Processor Architecture", In Proceedings of International Journal on Advances in Systems and Measurements, vol. 3, Issue 1 & 2 2010, pp. 71-81.

Valentine, Bob, "Introducing Sandy Bridge", Retrieved from: https://cesga.es/en/paginas/descargaDocumento/d/135 :, Retrieved on: Aug. 24, 2015, 54 Pages.

Wilhelm, Reinhard, "Determining Bounds on Execution Times", In Proceedings of Embedded Systems Design and Verification, vol. 1, Aug. 16, 2005, 33 Pages.

Wong, et al., "Efficient Methods for Out-of-Order Load/Store Execution for High-Performance soft Processors", In Proceedings of International Conference on Field-Programmable Technology, Dec. 9, 2013, pp. 442-445.

Wu, et al., "Block Based Fetch Engine for Superscalar Processors", In Proceedingsof the 15th International Conference on Computer Applications in Industry and Engineering, Nov. 7, 2002, 4 Pages.

Zmily, et al., "Block-Aware Instruction Set Architecture", In Dissertation Submitted to the Department of Electrical Engineering and the Committee on Graduate Studies of Stanford University in Partial Fulfillment of the Requirements for the Degree of Doctor of philosophy, Jun. 2007, 176 Pages.

Zmily, et al., "Improving Instruction Delivery with a Block-Aware ISA", In Proceedings of 11th International Euro-Par Conference on Parallel Processing, Aug. 30, 2005, 10 Pages.

* cited by examiner

LOCKING OPERAND VALUES FOR GROUPS OF INSTRUCTIONS EXECUTED ATOMICALLY

BACKGROUND

Designers of instruction set architectures (ISAs) and processors make power and performance trade-offs. As an example, if a designer chooses an ISA with instructions that deliver higher performance then the power consumption by the processor may be higher, as well. Alternatively, if the designer chooses an ISA with instructions that consume lower power, then the performance may be lower. The power consumption may be tied to the amount of hardware resources of the processor, such as arithmetic logic units (ALUs), cache lines, or registers, used by the instructions during execution. Use of a large amount of such hardware resources may deliver higher performance at the cost of higher power consumption. Alternatively, the use of a small amount of such hardware resources may result in lower power consumption at the cost of lower performance.

Compilers are used to compile high-level code into instructions compatible with the ISA and the processor architecture. During execution of the compiled instructions, any operands related to the instruction being executed are processed.

SUMMARY

In one example, the present disclosure relates to locking operands in the operand buffers of a processor for groups of instructions that are executed atomically. In one aspect, a method including, fetching a group of instructions, configured to execute by a processor, including a group header for the group of instructions, where the group header has a field including locking information for at least one operand. The method may further include storing a value of the at least one operand in at least one operand buffer of the processor. The method may further include based on the locking information, locking a value of the at least one operand in the at least one operand buffer of the processor such that the at least one operand is not cleared from the at least one operand buffer of the processor in response to completing execution of the group of instructions.

In another aspect, a processor including, a front-end control unit configured to: (1) fetch a group of instructions, wherein the group of instructions is configured to execute by a processor, and (2) store a value of at least one operand in at least one operand buffer of the processor, is provided. The processor may further include a back-end control unit configured to, using at least one control bit associated with the at least one operand, lock a value of the at least one operand in the at least one operand buffer of the processor such that the at least one operand is not cleared from the at least one operand buffer of the processor in response to completing execution of the group of instructions.

In yet another aspect, a method including, storing a value of at least one operand in at least one operand buffer of a processor, where the processor is configured to execute groups of instructions, is provided. The method may further include operating the processor in a first mode, where operating the processor in the first mode comprises, after completing execution of a first group of instructions: (1) fetching a second group of instructions for execution by the Processor and (2) not clearing the value of the at least one operand in the at least one operand buffer of the processor. The method may further include operating the processor in a second mode, where operating the processor in the second mode comprises, after completing execution of a third group of instructions: (1) fetching a fourth group of instructions for execution by the processor and (2) clearing the value of the at least one operand in the at least one operand buffer of the processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
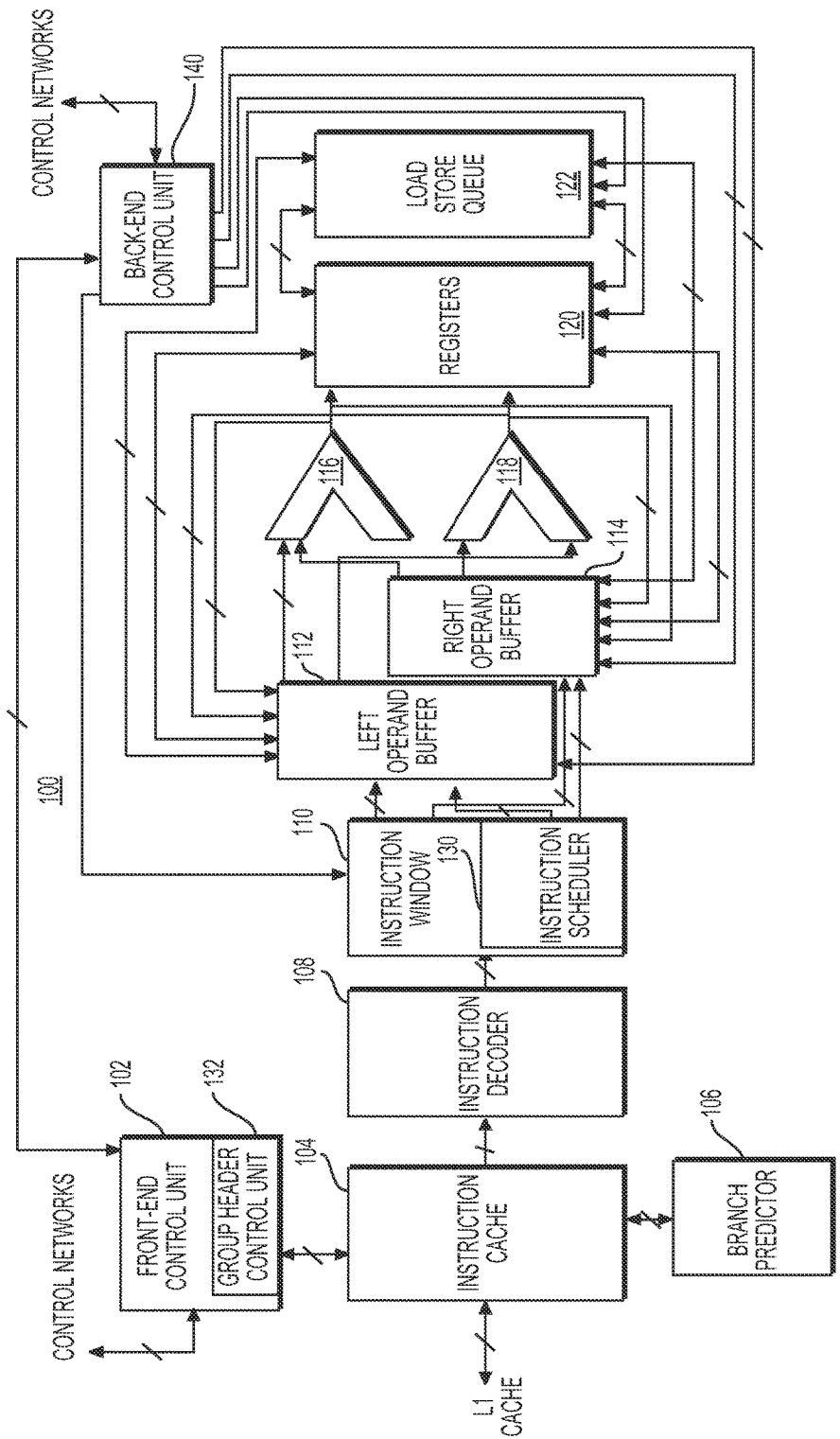
FIG. 1 is a block diagram of a representative processor in accordance with one example.

Examples described in this disclosure relate to instruction set architectures (ISAs) and processors that may have instructions organized in groups, e.g., instruction blocks, that are fetched, executed, and committed atomically. Thus, the processor may fetch the instructions belonging to a single group en masse, map them to the execution resources inside the processor, execute the instructions, and commit their results in an atomic fashion. The processor may either commit the results of all instructions or nullify the execution of the entire group. Instructions inside a group may execute in a data flow order. In addition, the processor may permit the instructions inside a group to communicate directly with each other. An instruction that produces a result may, instead of writing the result to a register file, communicate that result to another instruction that consumes the result. As an example, an instruction that adds the values stored in registers R1 and R2 may be expressed as shown in Table 1:

I[0] READ R1 T[2R];
I[1] READ R2 T[2L];
I[2] ADD T[3L].

In this way, source operands are not specified with the instruction; instead, they will be specified by the instructions that target the ADD instruction. The compiler may explicitly encode the control and data dependencies during compilation of the instructions and thereby may free the processor from rediscovering these dependencies at runtime. This may advantageously result in reduced processor load and energy savings during execution of these instructions. As an example, the compiler may use predication to convert all control dependencies into data flow instructions. Using these techniques, the number of accesses to power hungry register files may be reduced. Table 2, below, shows an example of a general instruction format for such instructions:

| OPCODE | PR | BID | XOP | TARGET1 | TARGET2 |
|---|---|---|---|---|---|

Each instruction may be of a suitable size, such as 32 bits, 64 bits, or another size. In the example shown in Table 2, each instruction may include an OPCODE field, a PR (predication) field, a BID (broadcast ID) field, an XOP (extended OPCODE) field, a TARGET1 field, and a TARGET2 field. The OPCODE field may specify a unique operation code for an instruction or a group of instructions, such as add, read, write, or multiply. The PR (predication) field may specify any predication associated with the instruction. As an example, a two bit PR field may be used as follows: 00—not predicated, 01—reserved, 10—predicated on false, and 11—predicated on true. Thus, for example, if an instruction executes only if the result of a comparison is true, then that instruction may be predicated on the result of another instruction that performs the comparison. The BID (broadcast ID) field may support sending of an operand to any number of consumer instructions in a group. A 2-bit BID field may be used to encode the broadcast channel the instruction receives one of its operands on. The XOP (extended OPCODE) field may support extending the types of opcodes. The TARGET1 and TARGET2 fields may allow up to two target instructions to be encoded. The target field may specify a consumer instruction of the result of the producer instruction, thus permitting direct communication between instructions.

An instruction may be ready to be issued by an instruction scheduler when all of the ready bits corresponding to that instruction are set to logic high (or logic low). An instruction, such as an ADD instruction may be ready to be scheduled or issued when both operands for the ADD instruction have been computed. As an example, there could be one ready bit for the left operand of the ADD instruction and another ready bit for the right operand of the ADD instruction. In another example, a predicated instruction may be ready when the predicate has been evaluated. Thus, for example, if the predicated instruction is predicated on a true value, then once the true value is evaluated, that instruction may be ready to be issued. In a simplified example, an instruction before being issued may be waiting on four inputs—true predicate, false predicate, left operand, and right operand. Other instructions may not have any inputs that they need to wait on, such as ADDI (add immediate) or READ values of operands from certain registers. In addition, certain results may need to be communicated to several instructions and in that case the instructions that need the result could listen to a broadcast channel. For example, certain predicated instructions, such as a branch instruction may execute only if its predicate is true or false. Both predicated branch instructions (e.g. BRO.T and BRO.F) may listen to broadcasts on a certain channel. The branch that will receive a matching predicate may fire. As another example, certain load instructions may listen to a channel, as well, and when the operands are available on that channel, they may fire. Broadcast instructions waiting on a broadcast ID (BID) may be ready when they receive ready bits from instructions targeting them.

Each group of instructions may have certain information associated with the group of instructions, such as control information and/or meta-information related to the group of instructions. This information may be generated by the compiler during compilation of higher-level code, such as C or C++ into instructions for execution on a processor consistent with the present disclosure. Some of this information may be extracted by the compiler during compiling a group of instructions and examining the nature of the instructions during runtime. Additionally or alternatively, the information associated with the group of instructions may be meta-information concerning the group of instructions. In one example, such information may be provided to a processor using special instructions or instructions that provide target encoding related to registers or other memory that may have the relevant information associated with the group of instructions. In case of special instructions, the opcode field of such instructions may be used to communicate information relating to the group of instructions. In another example, such information may be maintained as part of the processor status word (PSW). In one example, this information may advantageously help the processor execute the group of instructions more efficiently. One example of the types of information that could be provided to the processor using a group header, using special instructions, using memory referenced locations, using the processor status word (PSW), or using a combination of these, is in Table 3 below:

| Type of Information (Fields) | Description |
|---|---|
| ID | This field may be set to 1 to indicate the beginning of a valid group of instructions. It may also include information regarding machine version and architecture version. |
| SIZE | This field may contain the number of 4 instruction chunks contained in a group of instructions. Thus, for example, a value of 00 may indicate the smallest group of instructions in the group, e.g., a group header followed by 4 instructions. A value of 01 may indicate a group header followed by 8 instructions. A value of 10 may indicate a group header followed by 16 instructions. A value of 11 may indicate a group header followed by 32 instructions. This field may encode the size of the group of instructions in other ways. As an example, this field may specify the precise number of instructions in the group, e.g., a group header followed by seven instructions. As another example, this field may result in the processing of a function by the processor resulting in information about the size. |
| XFLAGS | This field may include flags that indicate special execution requirements for the group of instructions, such as:<br>XFLAGS[0] Vector Mode<br>This flag may indicate that the instructions will be copied into independent vector lanes, each of which may include an instruction window, operand buffers, an ALU, and registers.<br>XFLAGS[1] Inhibit Branch Predictor<br>This flag when set may result in the branch predictor being inhibited. This may prevent the branch predictor from predicting which way a branch will go before this is known for sure.<br>XFLAGS[2] Inhibit Memory Dependence Predictor<br>This flag when set may result in memory dependence being inhibited. This may prevent the memory dependence predictor from predicting dependencies between memory operations, such as load/store operations.<br>XFLAGS[3] Block Synchronization Required<br>This flag when set may impose a requirement that another group of instructions may not be executed on another core in parallel with the current group of instructions. In addition, this flag when set may also impose a requirement that the group of instructions may not execute speculatively.<br>XFLAGS[4] Break After Block<br>This flag when set may indicate that there is a break after the group of instructions.<br>XFLAGS[5] Break Before Block<br>This flag when set may indicate that there is break before the group of instructions. |

| Type of Information (Fields) | Description |
|---|---|
| | XFLAGS[6] Unlock Operands<br>This flag when set may indicate that any locked operands need to be unlocked after the completion of the execution of the current group of instructions.<br>XFLAGS[7] Reserved<br>This flag may be reserved for future use. |
| EXIT TYPES | This field may encode up to seven 3-bit group exit types for use by the branch predictor.<br>000—Null<br>This branch exit type may indicate to the branch predictor that there is no information for the branch predictor in this field.<br>001—Sequential<br>This branch exit type may indicate to the branch predictor that the next branch is to the next group of instructions in the code. The sequential branch exit type may be computed by factoring in the current address of the group of instructions and the size of the group of instructions, e.g., a current block address and the size of the block.<br>010—Offset<br>This branch exit type may indicate to the branch predictor that the next branch is to a block relative offset address, where the offset is treated as a group offset.<br>011—Indirect<br>This branch exit type may indicate to the branch predictor that the next branch is an indirect type. Thus, for example, it may rely on a register or a memory location that contains the address of the first instruction of the successor group of instructions.<br>100—Call<br>This branch exit type may indicate to the branch predictor that if the successor group of instructions contains a subroutine call then the predicted branch goes to that successor group of instructions.<br>101—Return<br>This branch exit type may indicate to the branch predictor that if the successor group of instructions contains a return from a subroutine call then the predicted branch goes to that successor group of instructions.<br>110—Clear<br>This branch exit type may indicate to the branch predictor that the previous group of instructions contained at least one instruction that used locked operands and it is now time to unlock the operands by, for example, asserting a clear signal to clear the valid bits associated with any locked operands. The remaining bit pattern may be reserved for future use. |
| STORE MASK | This field may identify the load-store identifiers (LSIDs) that are assigned to stores. As an example, the LSQ block may have to receive each of the LSIDs assigned to stores for a group of instructions before the group of instructions is allowed to complete. |
| WRITE MASK | This field may identify the global registers that the group of instructions may write. As an example, the register file may have to receive each entry of writes before the group of instructions is allowed to complete. |
| LOCK OPER- ANDS | This field may indicate to the processor that this group of instructions has at least one operand whose value may be locked in an operand buffer such that when this group of instructions commits or is reloaded, the next group of instructions does not clear a valid bit associated with the at least one operand. This field may include multiple bits for locking the value of multiple operands in their respective operand buffers. In addition, in one example, this field may also include the values of loop-invariant operands or other operands that need to be locked.<br>Alternatively or additionally, this field may include information that indicates to the processor that a load instruction's operands need to be locked.<br>Alternatively or additionally, this field may include information that indicates to the processor that a group (or groups) of instructions needs to be processed in a lock operand(s) mode, such that the locked operand values are not cleared until instructed to exit this mode.<br>Alternatively or additionally, this field may include information that the group header is not followed by an instruction; instead the next slot contains extended bits that have the information regarding which operands need to be locked. The extended bits may contain the operand values that need to be locked, as well.<br>In another example, the information in this field may denote that at least one operand in the group of instructions will be locked. Individual instructions may specify which operand will be locked. |

While the group header shown in Table 3 includes many fields, it is merely exemplary. In one embodiment, the compiler may select information for inclusion in a group header or for special instructions that can provide such information to the processor based on the nature of instructions and/or based on the nature of the processing requirements, such as high-performance or low-power. This may advantageously allow better balancing of trade-offs between performance and power consumption. For certain types of processing applications, such as high performance computing with a large number of cores, a large amount of information may be a desirable option. Alternatively, for other types of processing applications, such as embedded processors used in the Internet of Things, mobile devices, wearable devices, or other embedded computing type of applications, less information may be a desirable option. In another aspect, the extent of the information communicated via a group header or special instructions could be tailored depending upon the nature of the instructions in the group of instructions. For example, if the group of instructions includes a loop that is executed several times, then more extensive information might be needed to encapsulate the control information corresponding to the group of instructions. The additional control information may allow the processor to execute the loop more efficiently and thus improving performance. Alternatively, if there is a group of instructions that will be rarely executed, then relatively less information may suffice. In another example, if the group of instructions includes several predicated control loops, then more information may be needed. Similarly, if the group of instructions has an extensive amount of instruction level parallelism, then more information may be needed as part of a group header of via special instructions. The additional control information in the group header or special instructions could be used to effectively exploit the instruction level parallelism in the group of instructions. In another example, if the group of instructions includes several branch predictions, then more information may be needed. The additional control information regarding branch predictions will make the code execution more efficient as it will result in fewer pipeline flushes.

In ISAs and processors that execute groups of instructions (e.g., blocks) en masse, hardware resources needed to execute the group of instructions, such as operand buffers or load and store queues are reserved when the group of instructions is fetched. Because the compiler has already analyzed the high-level instruction code and identified data dependences, the group of instructions may be advantageously executed more efficiently. Many programs may spend most of their time executing only small portions of the code, e.g., certain loops repeatedly. The LOCK OPERANDS field may be used to store locking information corresponding to operands that may be processed by instructions in the group of instructions, including, for example, loops that execute repeatedly. The operands that may be locked include, but are not limited to, constants or other variables that do not change their value during execution by multiple groups of instructions.

The functionality corresponding to the fields, shown in Table 3, may be combined or further separated. Thus, for example, in one example, the field LOCK OPERANDS may be in a separate header. It could also be in a memory indexed by an address in the group header or another structure. Similarly, a special instruction may provide information related to any one of the fields in Table 3 or it may combine the information from such fields. As an example, while the exemplary group header of Table 3 includes a separate ID field and an SIZE field, these two fields could be combined into a single field. Similarly, a single special instruction could, when decoded, may provide information regarding the size of the group of instructions and the information in the ID field. Other changes could be made to the group header structure and format without departing from the scope of this disclosure. As an example, additional fields that include information relating to the characteristics of the group of instructions could be included. Certain fields might be included based on the frequency of the execution of the group of instructions.

The fields included in the group header structure, or information provided via special instructions or other mechanisms discussed earlier, may be part of a publicly available standard Instruction Set Architecture (ISA) of a particular processor or a family of processors. A subset of the fields may be a proprietary extension to the ISA. Certain bit values in the field may be part of the standard ISA for the processor, but certain other bit values in the field may provide proprietary functionality. This exemplary field could allow an ISA designer to add proprietary extensions to the ISA without disclosing entirely the nature and the functionality associated with the proprietary extension. Thus, in this instance, the compiler tools distributed by the ISA designer would support the proprietary bit values in the field, an entirely separate proprietary field, or a special instruction. The use of such a field may be particularly relevant to hardware accelerators that are proprietary to certain processor designs. Thus, a program may include a group header field or a special instruction that is unrecognizable; but the program may further include a recipe to decipher the field or decode the instruction.

A suitable compiler may process a group of instructions, configured to execute atomically by a processor, to generate information about the group of instructions, including meta-information and control information about the group of instructions. As part of this process, the compiler may also generate locking information for use consistent with this disclosure. Some programs may be compiled for only one set of ISA, e.g., an ISA used with processors for Internet of Things, mobile devices, wearable devices, or other embedded computing environments. Compiler may consider factors, such as the characteristics of the group of instructions and the frequency of the execution of the group of instructions. Compiler may consider factors, such as the characteristics of the group of instructions and the frequency of the execution of the group of instructions. The relevant characteristics of the group of instructions, include, but are not limited to: (1) the instruction level parallelism, (2) the number of loops, (3) the number of predicated control instructions, and (4) the number of branch predictions.

One example of a simplified 128 bit group header is shown in Table 4 below:

| 127 | 96 | 95 | 64 | 63 | 32 | 31 | 14 | 13 | 6 | 5 | 1 | 0 |
|---|---|---|---|---|---|---|---|---|---|---|---|---|
| LOCK OPERANDS | | WRITE MASK | | STORE MASK | | EXIT TYPES | | XFLAGS | | SIZE | | ID |

The first part of the group header (96 bits) includes fields, such as ID, SIZE, XFLAGS, EXIT TYPES, STORE MASK, and WRITE MASK, as discussed with respect to Table 3. In this example, the second part of the group header (32 bits) corresponds to the LOCK OPERANDS field as described with respect to Table 3. This way, when a new group of instructions is fetched and mapped to the resources of the processor, the valid bits for certain operands that need to stay locked may not be cleared. Instead, the locked operand values could be used again by the newly fetched and mapped group of instructions. Table 4 above is merely exemplary. The information related to locking operands may be encapsulated in other ways FIG. 1 is a block diagram of a portion of a representative processor 100 in accordance with one example of the present disclosure. Processor 100 may include a front-end control unit 102, a first instruction cache 104, a branch predictor 106, an instruction decoder 108, an instruction window 110, a left operand buffer 112, a right operand buffer 114, an arithmetic logic unit (ALU) 116, an arithmetic logic unit (ALU) 118, registers 120, a load/store queue 122, and a back-end control unit 140. In one example, each of the components of processor 100 may be interconnected via data and/or control busses, as shown by lines with arrows connecting the various components. In some instances, the busses may carry only data and instructions; in some instances, the busses may carry only data (e.g., operands); in other instances the busses may carry only control signals, e.g., front-end control unit 102 may communicate, via a bus that carries only control signals, with other control networks. In one example, front-end control unit 102 may include combinational logic and state machines to handle the front end of the processing, including instruction fetch and decode. As an example, front-end control unit 102 may fetch instructions from a L1-cache or another cache for storing into first instruction cache 104. Front-end control unit may also fetch instructions from instruction cache 104 or L-1 cache into instruction window 110, which may be processed by instruction decoder 108. As part of this process, front-end control unit may convert instruction addresses to respective instruction window addresses. A program for execution by processor 100 may include several groups of instructions. Front-end control unit 102 may determine placement of each group of instructions based on the constraints imposed by the respective group header (e.g., the group header described with respect to Table 3). Front-end control unit 102 may exchange control information with other portions of processor 100 via control networks. Back-end control unit 140 may control the back-end operations, including execute and commit operations. Processor 100 may include a single core or multiple cores. In case of a multi-core processor, there may be multiple instances of at least some of the elements shown in FIG. 1. Front-end control unit 102 and back-end control unit 140 may coordinate and manage control of various cores and other parts of the processor. Thus, in this example, groups of instructions may be simultaneously executing on multiple cores and front-end control unit 102 may exchange control information via control networks with other cores to ensure synchronization, as needed, for execution of the various groups of instructions. Front-end control unit 102 may fetch and decode a single instruction or multiple instructions per clock cycle. Although FIG. 1 shows a certain number of components of processor 100 arranged in a certain manner, there could be more or fewer number of components arranged differently.

In one example, certain groups of instructions may be fetched and mapped to instruction window 110 and if any of the groups of instructions have a back-edge (e.g., a group of instructions that branches back to itself), then instead of loading the instructions again from a memory, e.g., L-1 cache, the instructions may be left in instruction window 110 and only the valid bits in load/store queue 122 may be cleared. In one example, back-end control unit 140 may perform clearing of valid bits, or not, as needed. This may allow processor 100 to bypass the instruction fetch phase for such a group of instructions. Also, the valid bits for those operand buffers (e.g., left operand buffer 112 and right operand buffer 114) that have locking information specified by the group header (e.g., Table 3, LOCK OPERANDS field), are not cleared, such that they remain valid when the group of instructions that branched back to itself executes again. All or a subset of the operands related to a group of instructions may be locked. In one example, when a group of instructions issues, both the locked and the unlocked operands may be used. Upon completion of the execution of the group of instructions, only the values corresponding to the unlocked operands may be cleared.

The information regarding the locked operands may also be communicated by the compiler to processor 100 using other mechanisms, such as using special instructions, using memory referenced locations, using the processor status word (PSW), or using a combination of these. As an example, individual instructions can specify that their target is to be locked. As another example, the load instruction may include a control bit that may be used to lock the value of an operand loaded by the load instruction. One way to instruct processor 100 to lock operands may be to specify a mode in which processor 100 interprets certain fields in the instruction differently. For example, two out of the three bits of the broadcast ID (BID) field of an instruction could be interpreted as including control bits that indicate locking of operands, one for the left operand and the other for the right operand. In one example, this different mode could be communicated to processor 100 via the LOCK OPERANDS field of the group header. In another example, the locking information may be communicated using a special instruction that may be a special load instruction or an extended instruction in which two instructions are packed together. Another way to communicate the locking information may be to include a field (with control bits) in every instruction corresponding to each target of the instruction that instructs processor 100 to lock the operand(s) that the instruction is targeting. This way the target operands may be locked based on the value of the control bit in the instruction. In one example, the control bit may result in a reduction in a maximum size of the value of an operand that could be targeted using such an instruction.

In another example, the LOCK OPERANDS field of the group header may include locking information (e.g., bit values) that communicates to processor 100 information on interpreting a load instruction differently. For example, certain bit values may indicate that a left operand loaded by the load instruction needs to stay locked in an operand buffer until an unlocking mechanism unlocks the operand. An instruction, for example, an ADD instruction, in a group of instructions, may include one of the operands that is loop-invariant. In one example, that operand may be loaded using a load instruction that has a control bit to lock the operand value. In another example, the load instruction may be interpreted differently based on the LOCK OPERANDS field of the group header. In one example, when the group of instructions completes, as an example, either commits the results or nullifies the group, then the valid bits for the loop-invariant operand may not be cleared allowing that value of that operand to be used again without having to reload it or access a register file. In another example, even when a new group of instructions is fetched and mapped to the hardware resources of processor 100, the values of the locked operands may not be cleared. If the group of instructions is a loop that executes repeatedly for a certain number of times, then the values of the operands that are locked may be used again and again without having to reload them. In addition, the locking of operand values may advantageously reduce the number of instructions that are needed to complete operations relating to the locked operands. Also, the locking of operand values may reduce data movement and thus may advantageously result in consumption of less energy by a processor.

In one example, the locking of operand values may be advantageously used to improve pixel processing or image processing, such as image understanding kernels. These types of processing may include applying certain values to a large number of pixels on a row by row (or in some other manner) basis; the values that are repeatedly applied may be locked into operand buffers and the pixels could be processed faster. As an example, some of the locked operand buffers may be loaded with constants that are used again and again.

Each instruction in the group of instructions may have a ready bit, whose status may indicate to instruction scheduler 130 whether the instruction is ready to be scheduled or issued. Each instruction may also have valid bits relating to whether a true predicate is ready, a false predicate is ready, a left operand is ready, or a right operand is ready. In one example, the ready bit may be set to true when all of the valid bits for an instruction are set to true or are otherwise indicated as being not relevant. The valid bits may include: (1) at least one bit indicating a readiness of a left operand input to the at least one of the group of instructions and (2) at least a second bit indicating a readiness of a right operand input to the at least one of the group of instructions. A scheduled instruction may be issued by instruction scheduler 130 when all of its inputs (e.g. operands or predicates) have their valid bits set and it has not been issued before. Once an instruction is issued, a separate control bit that inhibits the issuance of the instruction again may be set. Instruction scheduler 130 may evaluate the valid bits (indicating whether a valid input is available) for the inputs to an instruction.

Once an instruction is issued, any operands may be loaded into left operand buffer 112 and/or right operand buffer 114 (as needed). Depending on the opcode of the instruction, operations may be performed on the operands using ALU 116 and/or ALU 118. The outputs of an ALU may be reloaded back into an operand buffer or stored into one or more registers 120. Once a group of instructions completes execution, its outputs may be committed using store operations into load/store queue 122. Branch predictor 106 may process information relating to branch exit types from a group header, a special instruction, or a memory referenced location and factor that information in making branch predictions.

With continued reference to FIG. 1, front-end control unit 102 may further include a group header control unit 132. Group header control unit 132 may process control information and/or meta-information for a group of instructions that may be executed atomically. In one example, group header control unit 132 may create and process group headers for such a group of instructions. As discussed earlier with respect to Table 3 the group header may include control information and/or meta-information regarding the group of instructions. Group header control unit 132 may include combinational logic, state machines, and temporary storage units, such as flip-flops to process the various fields in the group header. In one example, the control information and/or the meta-information for a group of instructions may include information in the LOCK OPERANDS field.

In one example relating to a group of instructions with a fixed size (e.g., 32 instructions) the group header will be at the beginning of a group of instructions and thus the initial value of the program counter (PC) will point to the group header. In another example relating to a variable size of group of instructions (e.g., 32, 64, 96, or 128 instructions), front-end control unit 102 will provide information regarding the size of the group of instructions currently in the instruction window to group header control unit 132. Once group header control unit 132 has this information, it may use it and the PC value to determine the location of the group header.

Figure 2:
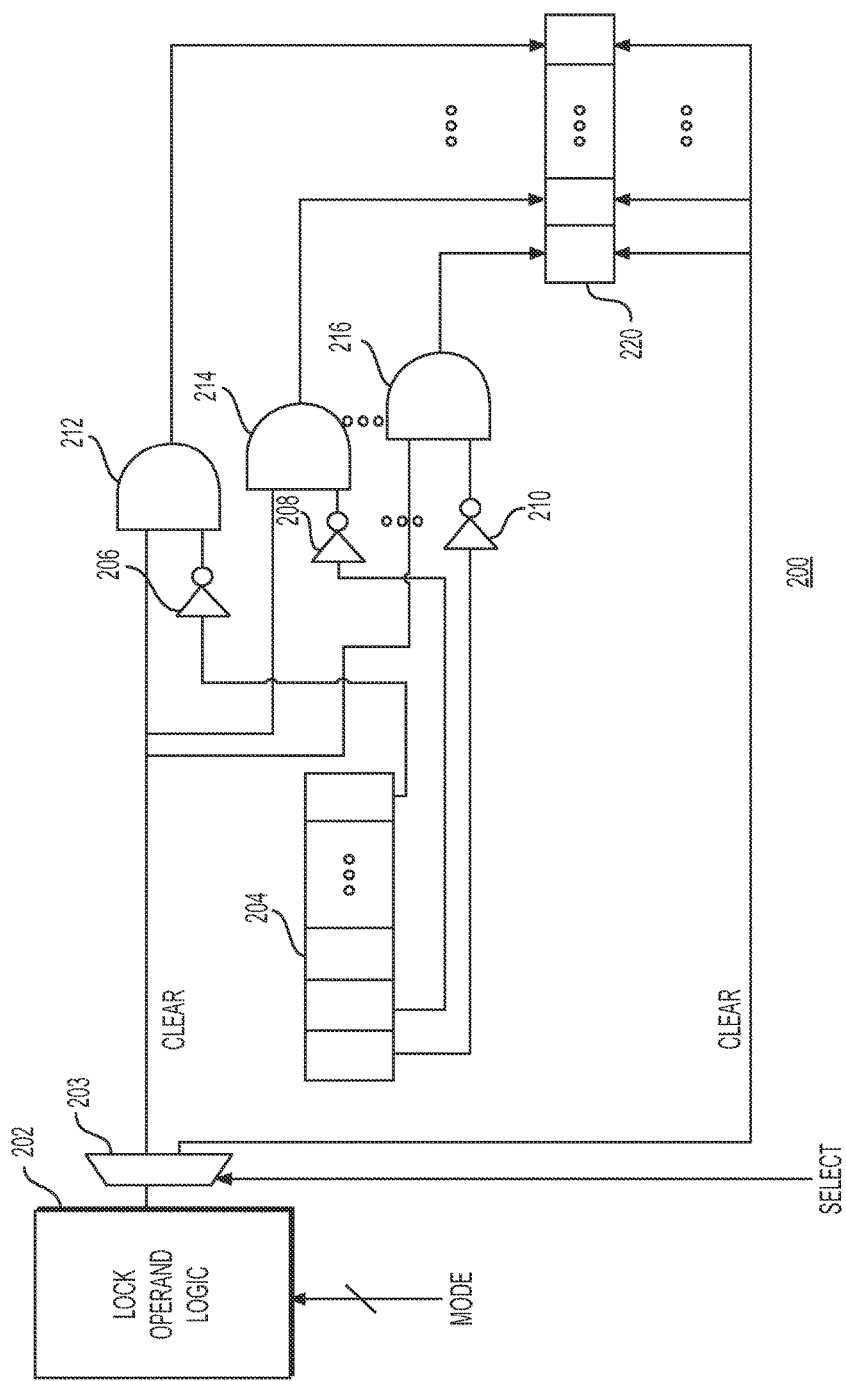
FIG. 2 is a block diagram of a portion of a back-end unit and its interface with the representative processor in accordance with one example.

FIG. 2 is a block diagram 200 of a portion of back-end unit 140 that may be used to: (1) clear all of the valid bits for the operands stored in the operand buffers, when a the current group of instructions completes execution or a new group of instructions is fetched or (2) clear only some or none of the valid bits for the operands stored in the operand buffers, when a the current group of instructions completes execution or a new group of instructions is fetched. Clearing of the valid bits will require new operands to be written into the operand buffers before they can be used. This portion of back-end unit 140 may include lock operand logic 202, a de-multiplexer 203 (controlled by SELECT signal), a locking information unit 204 for storing locking information, a set of inverters (206, 208, and 210), a set of AND gates (212, 214, and 216), and a valid bits storage unit 220 for storing valid bits corresponding to the operands in the operand buffers. Although FIG. 2 shows a certain number of inverters and a certain number of AND gates, the number of such components depends on the architecture of the processor. Lock operand logic 202 may assert a CLEAR signal (e.g., logic high) whenever a new group of instructions is mapped to instruction window 110 of processor 100 or the results of a group of instructions are committed. Locking information unit 204 may include lock bits corresponding to operands that need to be locked even if a new group of instructions is mapped to instruction window 110 of processor 100. As discussed earlier, the locking information, e.g., lock bits could be communicated to processor 100 in several different ways using different locking mechanisms. In one example, the SELECT SIGNAL may determine whether the CLEAR LINE is directly coupled to the circuitry that can reset stored valid bits, e.g., the valid bits stored in valid bits storage unit 220 or whether the CLEAR LINE is coupled in a different manner. This may permit the components shown in FIG. 2 to implement two different ways of resetting the valid bits for the operands in the operand buffers.

In one example, under the control of the SELECT SIGNAL, the CLEAR line may be coupled to the other input of each of the AND gates. Each of the lock bits may be coupled to an inverter, such as inverters (206, 208, and 210) shown in FIG. 2. The inverted values of the lock bits may be coupled to the other input of a respective AND gate, such as AND gates (212, 214, and 216) shown in FIG. 2. In one example, whenever a new group of instructions is mapped to instruction window 110 of processor 100 or the results of a group of instructions are committed, the CLEAR line may go to a logic high value. In one example, a high value of the lock bit may result in the operand not being cleared from an operand buffer; whereas, a low value of the lock bit may result in the operand being cleared from the operand buffer. When the lock bit of an operand is set to logic high, then when inverted (e.g., by inverter 206), the logic low value may be processed by an AND gate (e.g., by AND gate 212). This would result in a logic low signal outputted by the AND gate, and regardless of whether the CLEAR line is at a logic high value, that logic low signal will not be able to clear the valid bit (stored in valid bits storage unit 220) for the corresponding operand stored in the operating buffer. Alternatively, when the lock bit of the operand is set to low, then when inverted (e.g., by inverter 206), the logic high value may be processed by an AND gate (e.g., by AND gate 212). When the CLEAR line is at a logic high value, this would result in a logic high signal outputted by the AND gate, and that logic high signal will clear the valid bit for the corresponding operand stored in the operating buffer. Although FIG. 2 shows a certain number of components of processor 100 arranged in a certain manner, there could be more or fewer number of components arranged differently. Indeed, the valid bits for locked operands may be cleared using other mechanisms.

In another example, under the control of the SELECT SIGNAL, the CLEAR line may be directly coupled to the circuitry that can reset the valid bits for the operands. In this example, the portion of back-end unit 140 may rely on a MODE signal to control resetting of the valid bits. Lock operand logic 202 may assert a CLEAR signal that could have a logic high value or a logic low value, which may depend upon the MODE signal received by lock operand logic 202. In one example, the MODE signal may be based on whether processor 100 needs to be operated in a lock operand mode. In one example, this information may be included in the LOCK OPERANDS field of a group header. This information may indicate to the processor that a group (or groups) of instructions needs to be processed in a lock operand(s) mode, such that the valid bits for the locked operand values are not cleared until instructed to exit this mode. In this example, the CLEAR line may be set to a logic low value when the MODE signal indicates to lock operand logic 202 that the valid bits for the operands loaded previously into operand buffers should not be cleared. Alternatively, the CLEAR line may be set to a logic high value, which would result in the clearing of the operands in the operand buffers. Of course, other mechanisms may also be used to accomplish this objective.

Lock operand logic 202 may assert a logic high signal on the CLEAR line when it is time to unlock the operands, e.g., by clearing the lock bits and the valid bits for the operands that had been locked previously. In one example, clearing may refer to requiring the operand buffer to be written by a new value before it can be used by an instruction. This may be accomplished in many different ways. In one example, at the end of the loop or a series of loops, a group of instructions may include a special branch instruction that may cause the clearing of the valid bits for any operand values that were locked previously. In one example, this special branch instruction, when executed, may work with lock operand logic 202 to assert a logic high signal on the CLEAR line. As discussed earlier, the group header may include a flag indicating such an exit type, which may be designated in the group header via the field labeled as the "clear" branch exit type. As part of a second example, the next group of instructions that is fetched may be a special purpose group, whose only function is to provide a control signal to lock operand logic 202 that results in the assertion of a logic high signal on the CLEAR line. As part of a third example, there may be a jump to a special group of instructions whose function is to provide a control signal to lock operand logic 202 when this group of instruction commits that results in the assertion of a logic high signal on the CLEAR line. Of course, other mechanisms may also be used to assert a logic high signal on the CLEAR line resulting in the clearing of the lock bits and the valid bits for the locked operands.

Figure 3:
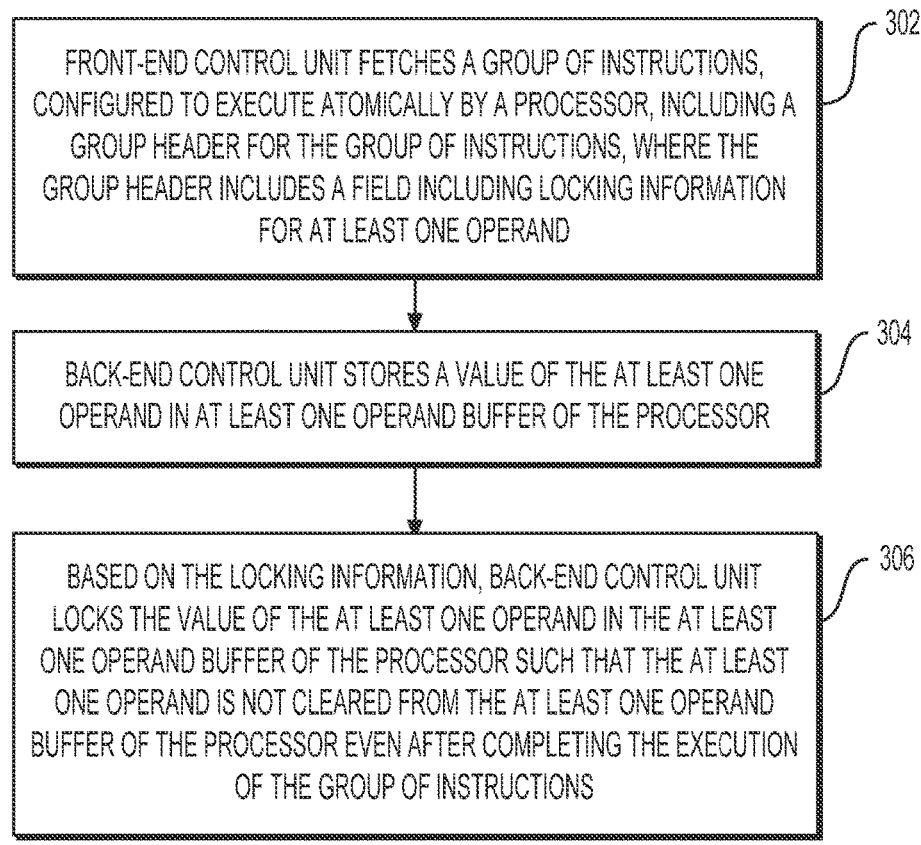
FIG. 3 is a flow diagram of a method in accordance with one example.

FIG. 3 is a flow diagram of a method in accordance with one example. In step 302, as an example, front-end control unit 102 may fetch a group of instructions that are configured to execute atomically by a processor, e.g., processor 100. In one example, the group of instructions need not be configured to execute atomically. As part of this step, front-end control unit may fetch a group header (e.g., as described with respect to Table 3) for the group of instructions, where the group header may include a field including locking information for at least one operand. The locking information may be any of the types of information discussed earlier with respect to the group header described in Table 3. After the group of instructions has been fetched by front-end control unit 102, the processing may move to step 304.

In step 304, as an example, a component of processor 100 (e.g., back-end control unit 140) may store a value of the at least one operand in at least one operand buffer (e.g., left operand buffer 112 or right operand buffer 114) of a processor (e.g., processor 100).

In step 306, back-end control unit 140 may, based on the locking information, lock a value of the at least one operand in the at least one operand buffer of the processor (e.g., processor 100) such that the at least one operand is not cleared from the at least one operand buffer of the processor even after completing the execution of the group of instructions. In one example, the detection of completion of the group of instructions to begin atomic commit may involve: counting the register writes, the stores, and one branch, and making sure that all previous blocks have committed. In one example, completing the execution of the group of instructions may include storing all results generated by the group of instructions in a register file (e.g., registers 120) and dispatching all stores related to the group of instructions from a load/store queue to a memory. In one example, locking the value of the at least one operand in the at least one operand buffer of the processor may include setting a value of a control bit associated with the at least one operand. In this example, a high logic value (or a low logic value) of the control bit may indicate that the operand is locked. In another example, the locking information may include at least one bit value in the group header (e.g., in the LOCK OPERANDS field of the exemplary group header of Table 3) that is used to change an interpretation of an existing field of an instruction in an instruction set architecture associated with the processor. In another example, the locking information may include an indication to the processor that the group header is followed by additional locking information. In another example, the locking information may include the value of the at least one operand that is locked during the locking step. As discussed earlier, the locking information may be generated by a compiler and may be communicated to processor 100 using different methods, including, for example, using a group header. In another example, as discussed earlier, the locking information may include at least one bit value in a field of an instruction in the group of instructions. Back-end control unit 140 may also unlock the value of the at least one operand using various unlocking mechanisms discussed earlier. In one example, the unlocking may be in response to a flag indicating unlocking of the at least one operand. In another example, the unlocking may be in response to a branch instruction. In another example, the unlocking may be in response to a jump to a group of instructions whose function is to unlock the value of the at least one operand.

Figure 4:
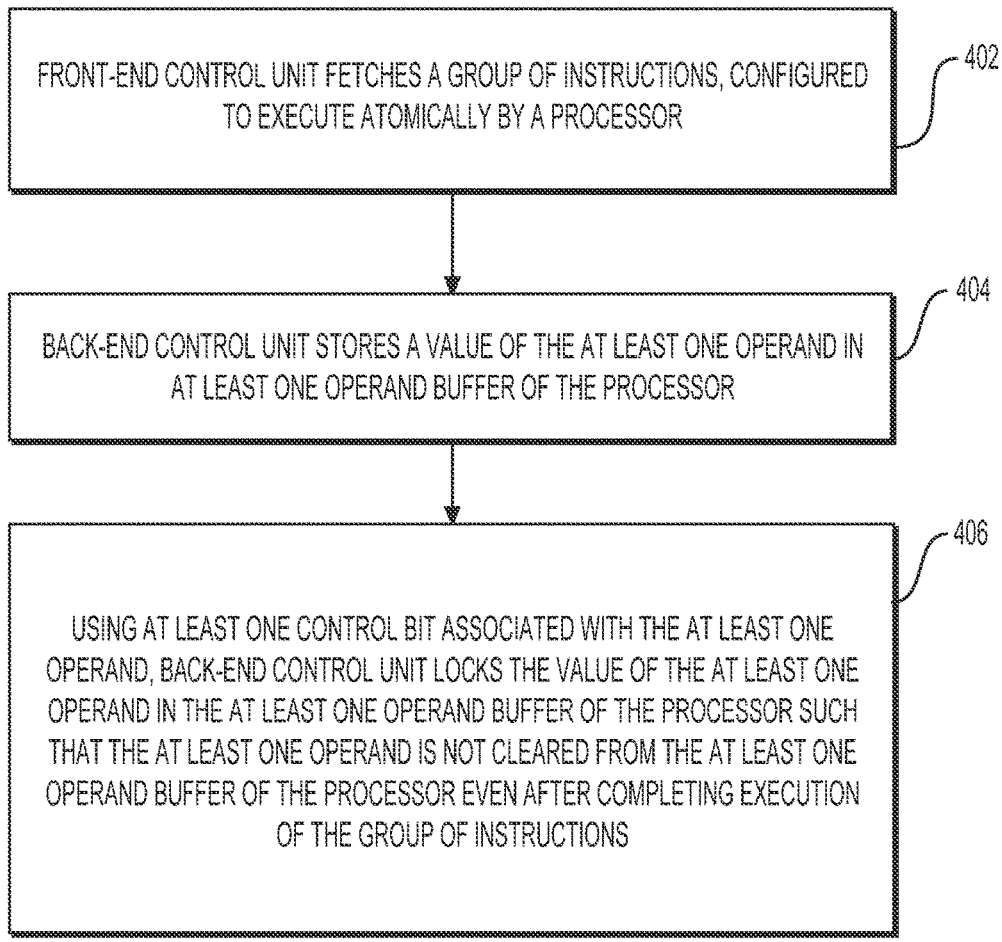
FIG. 4 is a flow diagram of a method in accordance with one example.

FIG. 4 is a flow diagram of a method in accordance with one example. In step 402, as an example, front-end control unit 102 may fetch a group of instructions that are configured to execute atomically by a processor, e.g., processor 100. In one example, the group of instructions need not be configured to execute atomically. After the group of instructions has been fetched by front-end control unit 102, the processing may move to step 404.

In step 404, as an example, a component of processor 100 (e.g., back-end control unit 140) may store a value of the at least one operand in at least one operand buffer (e.g., left operand buffer 112 or right operand buffer 114) of a processor (e.g., processor 100).

In step 406, back-end control unit 140 may, using at least one control bit associated with the at least one operand, lock a value of the at least one operand in the at least one operand buffer of the processor (e.g., processor 100) such that the at least one operand is not cleared from the at least one operand buffer of the processor even after completing execution of the group of instructions. In one example, the detection of completion of the group of instructions to begin atomic commit may involve: counting the register writes, the stores, and one branch, and making sure that all previous blocks have committed. In one example, completing the execution of the group of instructions may include storing all results generated by the group of instructions in a register file (e.g., registers 120) and dispatching all stores related to the group of instructions from a load/store queue to a memory. In this example, a high logic value (or a low logic value) of the control bit may indicate that the operand is locked. The value of the control bit itself may be determined based on any of the various types of locking information and locking mechanisms discussed earlier. Back-end control unit 140 may also unlock the value of the at least one operand using various unlocking mechanisms discussed earlier. In one example, the unlocking may be in response to a flag indicating unlocking of the at least one operand. In another example, the unlocking may be in response to a branch instruction. In another example, the unlocking may be in response to a jump to a group of instructions whose function is to unlock the value of the at least one operand.

Figure 5:
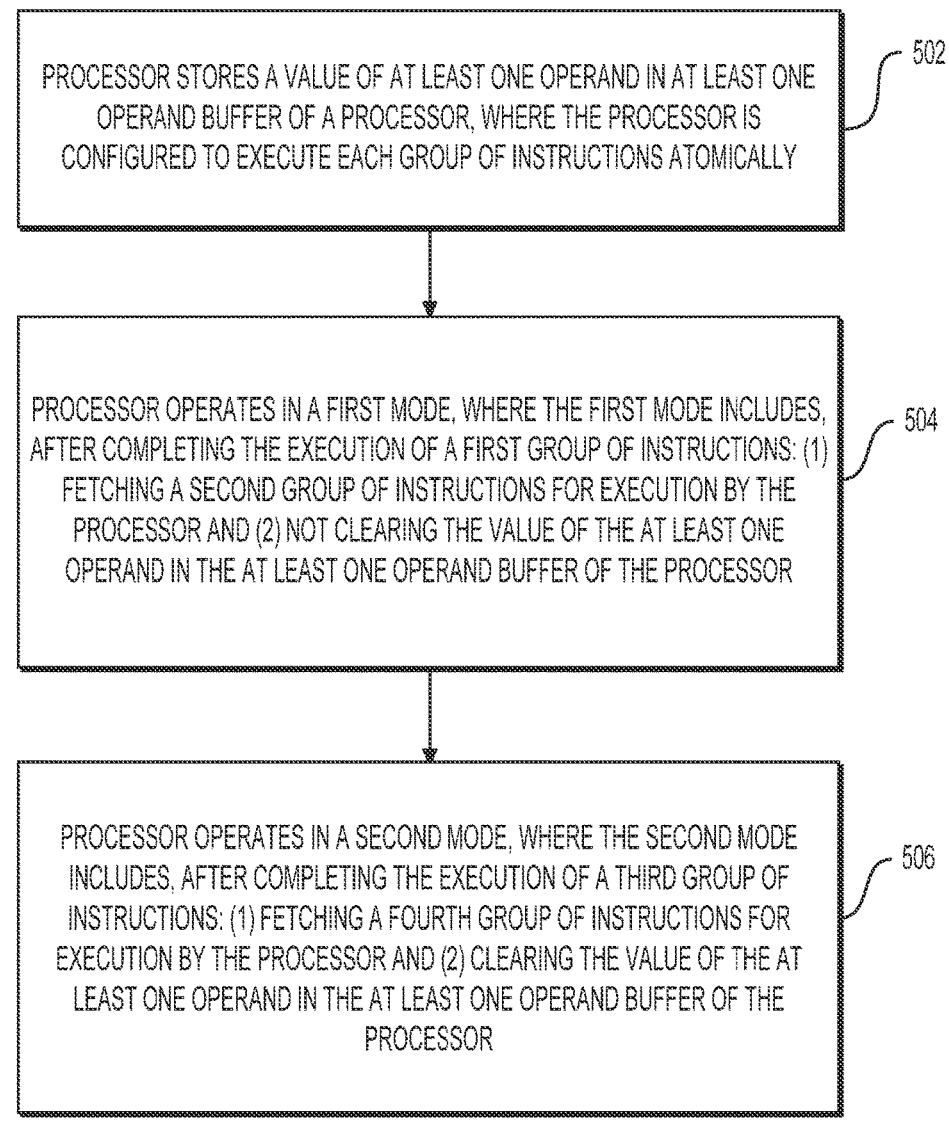
FIG. 5 is a flow diagram of a method in accordance with one example.

FIG. 5 is a flow diagram of a method in accordance with one example. In step 502, as an example, a processor component (e.g., back-end control unit 140) may store a value of the at least one operand in at least one operand buffer (e.g., left operand buffer 112 or right operand buffer 114) of a processor (e.g., processor 100). Processor 100 may be configured to execute each group of instructions atomically. In one example, the group of instructions need not be configured to execute atomically.

In step 504, processor 100 may operate in a first mode, where the first mode may include, after completing execution of a first group of instructions: (1) fetching a second group of instructions for execution by the processor and (2) not clearing the value of the at least one operand in the at least one operand buffer of the processor. In one example, front-end control unit 102 may fetch the second group of instructions and back-end control unit 140 may not clear the value of the at least one operand in the at least one operand buffer of the processor (e.g., processor 100). As discussed earlier with respect to FIG. 1 and FIG. 2, back-end control unit 140 may not clear the value of the at least one operand based on the MODE signal. MODE signal may control a mode in which processor 100 operates. In one example, the detection of completion of the group of instructions to begin atomic commit may involve: counting the register writes, the stores, and one branch, and making sure that all previous blocks have committed. In one example, completing the execution of the group of instructions may include storing all results generated by the group of instructions in a register file (e.g., registers 120) and dispatching all stores related to the group of instructions from a load/store queue to a memory. In addition, operating the processor in the first mode may further include fetching a group header (e.g., the group header discussed with respect to Table 3), including locking information requiring not clearing the value of the at least one operand in the at least one operand buffer of the processor, and where the locking information may include at least one bit value that is used to change an interpretation of an existing field of an instruction in an instruction set architecture associated with the processor. In another example, operating the processor in the first mode may further include fetching a group header (e.g., the group header discussed with respect to Table 3), including locking information requiring not clearing the value of the at least one operand in the at least one operand buffer of the processor, and where the locking information may include an indication to the processor that the group header is followed by additional locking information.

In step 506, processor 100 may operate in a second mode, where the second mode may include, after completing execution of a third group of instructions: (1) fetching a fourth group of instructions for execution by the processor and (2) clearing the value of the at least one operand in the at least one operand buffer of the processor. In one example, front-end control unit 102 may fetch the fourth group of instructions and back-end control unit 140 may clear the value of the at least one operand in the at least one operand buffer of the processor (e.g., processor 100). As discussed earlier with respect to FIG. 1 and FIG. 2, back-end control unit 140 may clear the value of the at least one operand based on the MODE signal. MODE signal may control a mode (e.g., the first mode or the second mode) in which processor 100 operates. In one example, completing the execution of the group of instructions may include storing all results generated by the group of instructions in a register file (e.g., registers 120) and dispatching all stores related to the group of instructions from a load/store queue to a memory. Back-end control unit 140 may also unlock the value of the at least one operand using various unlocking mechanisms discussed earlier. In one example, the unlocking may be in response to a flag indicating unlocking of the at least one operand. In another example, the unlocking may be in response to a branch instruction. In another example, the unlocking may be in response to a jump to a group of instructions whose function is to unlock the value of the at least one operand.

In conclusion, a method including fetching a group of instructions, configured to execute atomically by a processor, including a group header for the group of instructions, where the group header has a field including locking information for at least one operand, is provided. The method may further include storing a value of the at least one operand in at least one operand buffer of the processor. The method may further include based on the locking information, locking a value of the at least one operand in the at least one operand buffer of the processor such that the at least one operand is not cleared from the at least one operand buffer of the processor in response to completing execution of the group of instructions. In this method, the completing the execution of the group of instructions may further include: (1) storing all results generated by the group of instructions in a register file and (2) dispatching all stores related to the group of instructions from a load/store queue to a memory. In addition, in this method, the locking the value of the at least one operand in the at least one operand buffer of the processor may include setting a value of a control bit associated with the at least one operand. Furthermore, the locking information may include at least one bit value in the group header that is used to change an interpretation of an existing field of an instruction in an instruction set architecture associated with the processor. The locking information may also include an indication to the processor that the group header is followed by additional locking information. The locking information may further include the value of the at least one operand that is locked during the locking step. The locking information may also include at least one bit value in a field of an instruction in the group of instructions. This method may further include unlocking the value of the at least one operand in response to a flag indicating unlocking of the at least one operand. Additionally, this method may further include unlocking the value of the at least one operand in response to a branch instruction. This method may further include unlocking the value of the at least one operand in response to a jump to a group of instructions whose function is to unlock the value of the at least one operand.

In another aspect, a processor including, means for: (1) fetching a group of instructions, wherein the group of instructions is configured to execute atomically by a processor, and (2) storing a value of at least one operand in at least one operand buffer of the processor, is provided. The processor may further include means for, using at least one control bit associated with the at least one operand, locking a value of the at least one operand in the at least one operand buffer of the processor such that the at least one operand is not cleared from the at least one operand buffer of the processor in response to completing execution of the group of instructions. As an example, the means for fetching and storing may be front-end control unit 102 of FIG. 1, and the means for locking may be back-end control unit 140 of FIG. 1. In this processor, the completing the execution of the group of instructions may comprise: (1) storing all results generated by the group of instructions in a register file and (2) dispatching all stores related to the group of instructions from a load/store queue to a memory. This processor may also include means for unlocking the value of the at least one operand in the at least one operand buffer of the processor in response to a branch instruction. This processor may also include means for unlocking the value of the at least one operand in the at least one operand buffer of the processor in response to a jump to a group of instructions whose function is to unlock the value of the at least one operand in the at least one operand buffer of the processor. As an example, the means for unlocking may be back-end control unit 140 of FIG. 1.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., instruction cache 104 or other types of non-transitory media. The term "non-transitory media" as used herein refers to any media storing data and/or instructions that cause a machine, such as processor 100, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine, such as processor 100. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
   fetching a first group of instructions, configured to execute by a processor, including a group header for the first group of instructions, wherein the group header includes a field including locking information for at least a first operand and a second operand for processing by the first group of instructions;
   storing a value of the first operand in a first operand buffer of the processor and storing a value of the second operand in a second operand buffer of the processor;
   detecting completion of execution of the first group of instructions by counting:
      (1) register writes associated with the first group of instructions or (2) stores associated with the first group of instructions;
   based on the locking information, locking a value of the first operand in the first operand buffer of the processor such that the first operand is not cleared from the first operand buffer of the processor in response to the completion of the execution of the first group of instructions even when a second group of instructions, for execution by the processor after the completion of the execution of the first group of instructions, is a new group of instructions comprising different instructions from the first group of instructions; and
   based on the locking information, in response to the completion of the execution of the first group of instructions, clearing the value of the second operand from the second operand buffer of the processor.

2. The method of claim 1, wherein the first group of instructions is configured to execute atomically by the processor, and wherein the completion of the execution of the first group of instructions comprises: (1) storing all results generated by the first group of instructions in a register file and (2) dispatching all stores related to the first group of instructions from a load/store queue to a memory.

3. The method of claim 1, wherein the locking the value of the first operand in the first operand buffer of the processor comprises setting a value of a first control bit associated with the first operand.

4. The method of claim 1, wherein the locking information comprises at least one bit value in the group header that is used to change an interpretation of an existing field of an instruction in an instruction set architecture associated with the processor.

5. The method of claim 1, wherein the locking information comprises an indication to the processor that the group header is followed by additional locking information.

6. The method of claim 1, wherein the locking information comprises the value of the first operand that is locked during the locking step.

7. The method of claim 1, wherein the locking information comprises the value of the first operand in a field of an instruction in the first group of instructions.

8. The method of claim 1 further comprising unlocking the value of the first operand in response to a flag indicating unlocking of the first operand.

9. The method of claim 1 further comprising unlocking the value of the first operand in response to a branch instruction.

10. The method of claim 1 further comprising unlocking the value of the first operand in response to a jump to a group of instructions whose function is to unlock the value of the first operand.

11. A processor comprising:
a front-end control unit configured to:
fetch a first group of instructions, wherein the first group of instructions is configured to execute by the processor, and
store a value of a first operand in a first operand buffer of the processor and store a value of a second operand in a second operand buffer of the processor; and
a back-end control unit configured to: detect completion of execution of the first group of instructions by counting: (1) register writes associated with the first group of instructions or (2) stores associated with the first group of instructions and based on a first control bit associated with the first operand, lock a value of the first operand in the first operand buffer of the processor such that the first operand is not cleared from the first operand buffer of the processor in response to the completion of the execution of the first group of instructions even when a second group of instructions, for execution by the processor after completing the execution of the first group of instructions, is a new group of instructions comprising different instructions from the first group of instructions, and based on a second control bit associated with the second operand, in response to the completion of the execution of the first group of instructions clear the value of the second operand from the second operand buffer of the processor.

12. The processor of claim 11, wherein the first group of instructions is configured to execute atomically by the processor, and wherein the completion of the execution of the first group of instructions comprises: (1) storing all results generated by the first group of instructions in a register file and (2) dispatching all stores related to the first group of instructions from a load/store queue to a memory.

13. The processor of claim 11, wherein the back-end control unit is further configured to unlock the value of the first operand in the first operand buffer of the processor in response to a flag.

14. The processor of claim 11, wherein the back-end control unit is further configured to unlock the value of the first operand in the first operand buffer of the processor in response to a branch instruction.

15. The processor of claim 11, wherein the back-end control unit is further configured to unlock the value of the first operand in the first operand buffer of the processor in response to a jump to a group of instructions whose function is to unlock the value of the first operand in the first operand buffer of the processor.

16. A method comprising:
storing a value of a first operand in a first operand buffer of a processor and storing a value of a second operand in a second operand buffer of the processor, wherein the processor is configured to execute groups of instructions;
detecting completion of execution of the first group of instructions by counting:
(1) register writes associated with the first group of instructions or (2) stores associated with the first group of instructions;
operating the processor in a first mode, wherein operating the processor in the first mode comprises, after the completion of the execution of a first group of instructions: (1) executing a second group of instructions using the processor, wherein the second group of instructions is different from the first group of instructions and (2) not clearing the value of the first operand in the first operand buffer of the processor based on first locking information contained in a first group header associated with the first group of instructions and clearing the value of the second operand from the second operand buffer based on the first locking information contained in the first group header associated with the first group of header; and
operating the processor in a second mode, wherein operating the processor in the second mode comprises, after the completion of the execution of a third group of instructions: (1) executing a fourth group of instructions using the processor, wherein the fourth group of instructions is different from the third group of instructions and (2) clearing the value of the first operand in the first operand buffer of the processor based on second locking information contained in a second group header associated with the third group of instructions.

17. The method of claim 16, wherein operating the processor in the first mode further comprises fetching the first group header, including the first locking information requiring not clearing the value of the first operand in the first operand buffer of the processor, and wherein the first locking information comprises at least one bit value that is used to change an interpretation of an existing field of an instruction in an instruction set architecture associated with the processor.

18. The method of claim 16, wherein operating the processor in the first mode further comprises fetching the first group header, including the first locking information requiring not clearing the value of the first operand in the first operand buffer of the processor, and wherein the first locking information comprises an indication to the processor that the first group header is followed by additional locking information.

19. The method of claim 16, wherein operating the processor in the second mode further comprises clearing the value of the first operand in the first operand buffer of the processor in response to a flag indicating clearing of the first operand.

20. The method of claim 16, wherein operating the processor in the second mode further comprises clearing the value of the first operand in the first operand buffer of the processor in response to a branch instruction.

* * * * *